US012687696B2

(12) United States Patent
Jang et al.

(10) Patent No.: US 12,687,696 B2
(45) Date of Patent: Jul. 21, 2026

(54) OPTICAL SYSTEM

(71) Applicant: SAMSUNG ELECTRO-MECHANICS CO., LTD., Suwon-si (KR)

(72) Inventors: Dong Hyuk Jang, Suwon-si (KR); Jong Gi Lee, Suwon-si (KR); Yong Joo Jo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 364 days.

(21) Appl. No.: 17/721,591

(22) Filed: Apr. 15, 2022

(65) Prior Publication Data

US 2023/0072736 A1 Mar. 9, 2023

(30) Foreign Application Priority Data

Sep. 2, 2021 (KR) .......................... 10-2021-0117218

(51) Int. Cl.
*G02B 13/00* (2006.01)
*G02B 9/10* (2006.01)
(52) U.S. Cl.
CPC ............. *G02B 13/003* (2013.01); *G02B 9/10* (2013.01)
(58) Field of Classification Search
CPC ................................ G02B 9/10; G02B 13/003
See application file for complete search history.

(56) References Cited

U.S. PATENT DOCUMENTS

| | | | |
|---|---|---|---|
| 5,218,478 A | 6/1993 | Itoh | |
| 6,525,886 B1 | 2/2003 | Lewis | |
| 9,323,032 B2 | 4/2016 | Amano | |

| | | | |
|---|---|---|---|
| 2006/0082899 A1 | 4/2006 | Kogo | |
| 2007/0058267 A1 | 3/2007 | Kawana | |
| 2007/0070520 A1 | 3/2007 | Kimura et al. |
| 2008/0106801 A1 | 5/2008 | Kang et al. |
| 2013/0279019 A1 | 10/2013 | Lee | |
| 2015/0070778 A1 | 3/2015 | Amano | |
| 2017/0212337 A1 | 7/2017 | Lee et al. |
| 2017/0307862 A1 | 10/2017 | Lin et al. |
| 2018/0172953 A1 | 6/2018 | Hirose | |

FOREIGN PATENT DOCUMENTS

| | | |
|---|---|---|
| CN | 1932575 A | 3/2007 |
| CN | 104285174 A | 1/2015 |
| CN | 106997092 A | 8/2017 |

(Continued)

OTHER PUBLICATIONS

Korean Office Action issued on Feb. 19, 2024, in counterpart Korean Patent Application No. 10-2021-0117218 (7 pages in English, 6 pages in Korean).

(Continued)

*Primary Examiner* — Jack Dinh

(74) *Attorney, Agent, or Firm* — NSIP Law

(57) ABSTRACT

An optical system includes a first lens group including at least one lens, and a second lens group including at least one lens, wherein the first lens group and the second lens group are disposed in order from an object side, wherein each of the first lens group and the second lens group is configured to move in an optical axis direction to change a magnification between a wide-angle end and a telephoto end, and wherein G1F is a focal length of the first lens group, G2F is a focal length of the second lens group, and |G1F/G2F| has a value of between 0.5 and 1.

14 Claims, 21 Drawing Sheets

[Position 1]

(56)                    References Cited

FOREIGN PATENT DOCUMENTS

| | | | |
|---|---|---|---|
| JP | 4742293 | B2 | 8/2011 |
| JP | 2022-36249 | A | 3/2022 |
| KR | 10-0453338 | B1 | 5/2005 |
| TW | 200821621 | A | 5/2008 |
| TW | 201239442 | A1 | 10/2012 |
| TW | 201344238 | A | 11/2013 |
| TW | 201802531 | A | 1/2018 |

OTHER PUBLICATIONS

Taiwanese Office Action Issued on Jan. 4, 2023, in counterpart Taiwanese Patent Application No. 111114967 (6 Pages in Chinese, 6 Pages in English).

Chinese Office Action issued on Dec. 9, 2024, in Counterpart Chinese Patent Application No. 202210883632.1 (17 Pages in English, 16 Pages in Chinese).

Taiwanese Office Action issued on May 15, 2025, in corresponding Taiwanese Patent Application No. 113108775. (8pages in English, 7pages in Taiwanese).

Indian Office Action Issued on Oct. 14, 2025, in counterpart Indian Patent Application No. 202214022343 (8 Pages both in English and Hindi).

Taiwanese Office Action Issued on Dec. 5, 2025, in counterpart Taiwanese Patent Application No. 113108775 (6 Pages in English, 5 Pages in Chinese).

Indian Office Action issued on May 14, 2026, in counterpart Indian Patent Application No. 202214022343 (3 Pages in English and Hindi).

[Position 1]

[Position 2]

[Position 1]

[Position 2]

[Position 1]

[Position 2]

[Position 1]

[Position 2]

[Position 1]

[Position 2]

[Position 1]

[Position 2]

[Position 1]

[Position 2]

OPTICAL SYSTEM

CROSS-REFERENCE TO RELATED APPLICATIONS

This application claims the benefit under 35 USC 119(a) of Korean Patent Application No. 10-2021-0117218 filed on Sep. 2, 2021, in the Korean Intellectual Property Office, the entire disclosure of which is incorporated herein by reference for all purposes.

BACKGROUND

1. Field

Example embodiments of the present disclosure relate to an optical system, and more particularly, to a zoom optical system.

2. Description of the Background

A plurality of cameras may be mounted in a mobile device. To provide images at various magnifications, a general mobile device may include both a wide-angle camera having a short focal length and a telephoto camera having a long focal length. Accordingly, the area occupied by the cameras may increase and related costs may also increase.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an optical system includes a first lens group including at least one lens, and a second lens group including at least one lens, wherein the first lens group and the second lens group are disposed in order from an object side, wherein each of the first lens group and the second lens group is configured to move in an optical axis direction to change a magnification between a wide-angle end and a telephoto end, and wherein G1F is a focal length of the first lens group, G2F is a focal length of the second lens group, and |G1F/G2F| has a value of between 0.5 and 1.

The first lens group may have positive refractive power, and the second lens group may have negative refractive power.

The entire number of lenses included in the first lens group and the second lens group may be six, seven, or eight.

The first lens group may include four or more lenses having refractive power, and the second lens group may include two or more lenses having refractive power.

At least one of an object-side surface and an image-side surface of the at least one lens of the first lens group and the second lens group may be aspherical.

G1_OAL is a distance between an object-side apex of a lens most adjacent to the object side among the at least one lens included in the first lens group and an image-side apex of a lens most adjacent to the image side among the at least one lens included in the first lens group, and G1_OAL may be less than 10 mm.

The first lens group may include a first lens, a second lens, and a third lens disposed in order from the object side to the image side, and 1x_f is a focal length of the optical system at the wide-angle end, f3 is a focal length of the third lens, and |1x_f/f3| may have a value of between 1 and 2.

The first lens group may include a first lens, a second lens, and a third lens disposed in order from the object side to the image side, and 2x_f is a focal length of the optical system at the telephoto end, f3 is a focal length of the third lens, and |2x_f/f3| may have a value of between 2 and 3.8.

1xL is a distance from an object-side surface of a lens most adjacent to the object side among the at least one lens of the first lens group at the wide-angle end to an imaging plane, 2xL is a distance from the object-side surface of the lens most adjacent to the object side at the telephoto end to the imaging plane, and 1xL/2xL may be greater than 0.7.

1xB is a distance from an apex of an image-side surface of a lens most adjacent to the image side among the at least one lens of the second lens group at the wide-angle end to the imaging plane, 2xB is a distance from the apex of the image-side surface of the lens most adjacent to the image side at the telephoto end to the imaging plane, and 1xB/2xB may be greater than 0.1.

At least one of the object-side surface and the image-side surface of the at least one lens of the first lens group and the second lens group may include at least one inflection point.

The first lens group may include a first lens having positive refractive power, a second lens having refractive power, a third lens having refractive power, a fourth lens having refractive power, and a fifth lens having refractive power, disposed in order from the object side to the image side.

The second lens group may include a sixth lens having refractive power and a seventh lens having positive refractive power, disposed in order from the object side to the image side.

The optical system may further include an aperture stop disposed between the first lens group and the second lens group.

In another general aspect, an optical system includes a first lens group including a first lens, a second lens, a third lens, a fourth lens, and a fifth lens, each having refractive power, and a second lens group including a sixth lens having refractive power, and a seventh lens having negative refractive power, wherein the first through the seventh lenses are disposed in numerical order from an object side, wherein each of the first lens group and the second lens group is configured to move in an optical axis direction to change a magnification between a wide-angle end and a telephoto end, and wherein 1xL is a distance from an object-side surface of the first lens at the wide-angle end to an imaging plane, 2xL is a distance from the object-side surface of the first lens at the telephoto end to the imaging plane, and 1xL/2xL is greater than 0.7.

G1F is a focal length of the first lens group, G2F is a focal length of the second lens group, and |G1F/G2F| may have a value of between 0.5 and 1.

The first lens may have a negative refractive power.

In another general aspect, an optical system includes a first lens group including a first lens, a second lens, a third lens, and a fourth lens, each having refractive power, and a second lens group including a fifth lens and a sixth lens, each having refractive power, wherein the first through the sixth lenses are disposed in numerical order from an object side, wherein each of the first lens group and the second lens group is configured to move in an optical axis direction to change a magnification between a wide-angle end and a telephoto end, wherein 1x_f is a focal length of the optical system at the wide-angle end, f3 is a focal length of the third lens, and |1 x_f/f3| has a value of between 1 and 2, and wherein the entire number of lenses included in the first lens group and the second lens group is six.

In another general aspect, an optical system includes a first lens group comprising a first lens, a second lens, a third lens, a fourth lens, and a fifth lens, each having refractive power, and a second lens group comprising a sixth lens having refractive power, a seventh lens having positive refractive power, and an eighth lens having refractive power, wherein the first through the seventh lenses are disposed in this order from an object side, wherein each of the first lens group and the second lens group is configured to move in an optical axis direction to change a magnification between a wide-angle end and a telephoto end, and wherein 1xL is a distance from an object-side surface of the first lens at the wide-angle end to an imaging plane, 2xL is a distance from the object-side surface of the first lens at the telephoto end to the imaging plane, and 1xL/2xL is greater than 0.7.

The first lens may have a positive refractive power.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1A:
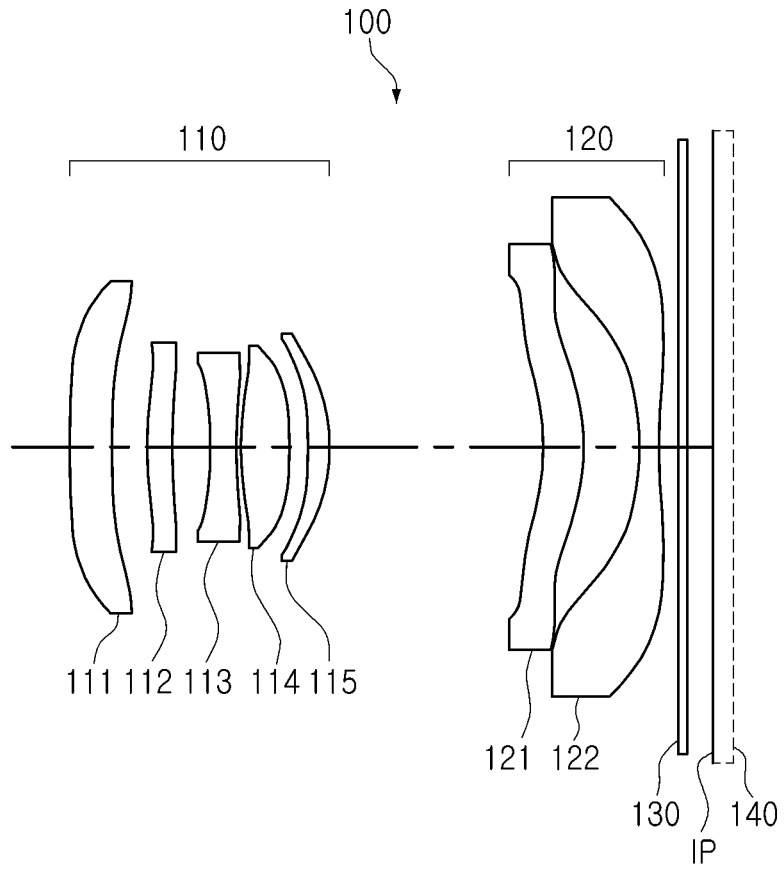
FIG. 1A is a cross-sectional diagram illustrating an optical system in a first position according to a first example embodiment of the present disclosure.

Hereinafter, while example embodiments of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

In the example embodiments, the X-direction, the Y-direction, and the Z-direction may refer to a direction parallel to the X axis, a direction parallel to the Y axis, and a direction parallel to the Z axis, respectively, illustrated in the drawings. Also, the X-direction may include both the +X-axis direction and the −X-axis direction, which may also be applied to the Y-direction and the Z-direction, unless otherwise indicated.

In example embodiments, the notion that two directions (or axes) are parallel to or perpendicular to each other may also include the examples in which the two directions (or axes) are substantially parallel or substantially side by side with each other. For example, the notion that the first axis and the second axis are perpendicular to each other may indicate that the first axis and the second axis may form an angle of 90 degrees or a degree approximate to 90 degrees.

The paragraphs beginning with "in an example embodiment" do not necessarily refer to the same embodiments. The particular features, structures, or characteristics may be combined in any suitable manner consistent with the present disclosure.

In example embodiment, "configured to" indicates that a component may include a structure necessary to implement a certain function.

An effective aperture radius of a lens surface is a radius of a portion of the lens surface through which light actually passes, and is not necessarily a radius of an outer edge of the lens surface. An object-side surface of a lens and an image-side surface of the lens may have different effective aperture radiuses.

Stated another way, an effective aperture radius of a lens surface is a distance in a direction perpendicular to an optical axis of the lens surface between the optical axis of the lens surface and a marginal ray of light passing through the lens surface.

A thickness, a size, and a shape of the lens in the drawings may be exaggerated, and in particular, the shape of the spherical or aspherical surface presented in the diagram of the lens configuration is merely an example and the shape is not limited thereto.

The optical system according to an example embodiment may be mounted on a portable electronic device. For example, the optical system may be a component of a camera module mounted on a portable electronic device. The portable electronic device may be implemented as a portable electronic device such as a mobile communications terminal, a smart phone, or a tablet PC.

In the example embodiments, a unit of a radius of curvature, a thickness, a distance, a focal length, and the like, are indicated in millimeters (mm), and a unit of a field of view is indicated in degree.

In the description of the shape of each lens, the configuration in which one surface may be convex indicates that a paraxial region portion of the surface may be convex, and the configuration in which one surface may be concave indicates that a paraxial region portion of the surface may be concave. Therefore, even when it is described that one surface of the lens may be convex, the edge portion of the lens may be concave.

A paraxial region of a lens surface refers to a central portion of the lens surface surrounding and including the optical axis of the lens surface in which light rays incident to the lens surface make a small angle $\theta$ to the optical axis, and the approximations $\sin \theta \approx \theta$, $\tan \theta \approx \theta$, and $\cos \theta \approx 1$ are valid.

The optical system may further include an image sensor having an imaging surface disposed at the imaging plane of the optical system. The image sensor converts an image of an object formed on an effective imaging area of the imaging surface by the lenses of the optical system into an electrical signal.

ImgH is a maximum effective image height of the optical system and is equal to one half of a diagonal length of the effective imaging area of the imaging surface (imaging plane) of the image sensor.

The optical system may further include at least one reflective member having a reflective surface that changes a direction of an optical path in the optical system. For example, the reflective member may be a prism or a mirror. For example, the reflective member may be disposed in the optical path on the object-side of the first lens, between any two lenses among the second to last (sixth, seventh, or eighth) lenses, or on the image-side of the last lens (sixth, seventh, or eighth lens).

The first lens (or the forwardmost lens) may refer to the lens most adjacent to an object side (or a first reflecting member), and the last lens (or the rearmost lens) may refer to the lens most adjacent to the image sensor (or a rearmost reflecting member).

In describing the configuration of each lens, an image side may indicate, for example, a direction in which an imaging plane on which an image is formed or a direction in which an image sensor is disposed, and an object side may indicate a direction in which the object is disposed. Also, the "object-side surface" of the lens may refer to, for example, a lens surface on the side on which a subject is present with respect to the optical axis, and the "image-side surface" may refer to a lens surface on the side on which the imaging plane is present with respect to the optical axis. The imaging plane may be, for example, a surface of an imaging device or a surface of an image sensor. The image sensor may include, for example, a sensor such as a complementary metal oxide semiconductor (CMOS) or a charge coupled device (CCD). The image sensor is not limited thereto, and may be implemented as a device converting an image of a subject into an electrical image signal, for example.

One or more example embodiments of the present disclosure provide an optical system providing various magnifications with a single camera, and also provide an optical system providing various magnifications with a single camera and capturing high-resolution images.

Referring to FIGS. 1A to 7B, the optical system may include two lens groups, and an image sensor. Each of the first lens group and the second lens group may move in the optical axis direction with respect to the image sensor. As a distance between the first lens group, the second lens group, and the image sensor changes, a magnification of the optical system may change. That is, each of the first lens group and the second lens group may be configured to move in the optical axis direction when changing the magnification from a wide-angle end to a telephoto end.

When the first lens group, the second lens group, and the image sensor are disposed with a distance therebetween as in FIG. 1A, 2A, 3A, 4A, 5A, 6A, or 7A, the optical system may be defined as being in a first position (Position 1). When the first lens group, the second lens group, and the image sensor are disposed with a distance therebetween as in FIG. 1B, 2B, 3B, 4B, 5B, 6B, or 7B, the optical system may be defined as being in a second position (Position 2). Referring to Table 1, Table 3, Table 5, Table 7, Table 9, Table 11, or Table 13, when the optical system in each example embodiment is disposed in the first position and the second position, the distance between the first lens group and the second lens group and the distance between the second lens group and the image sensor may change. In the example embodiment, the first position may be referred to as a wide-angle end, and the second position may be referred to as a telephoto end. That is, when the first lens group and the second lens group are disposed in the first position, the optical system may be at the wide-angle end, and when the first lens group and the second lens group are disposed in the second position, the optical system may be at the telephoto end.

The optical system may include an infrared filter disposed between the lens most adjacent to the image side and the image sensor. The infrared filter may be formed of, for example, a glass material. However, other materials may be used. In another example embodiment, the infrared filter may not be provided. The optical system may include an aperture stop disposed between the first lens group and the second lens group.

The first lens group may have positive refractive power and the second lens group may have negative refractive power. Each of the lens groups may include at least one lens having refractive power. In the example embodiment, a lens may refer to a lens having refractive power, unless otherwise specified. When the lens group includes two or more lenses, the lenses included in the lens group may move together while maintaining a distance therebetween.

The optical system may include six, seven, or eight lenses having refractive power in total. For example, the optical system may include a first lens, a second lens, a third lens, a fourth lens, a fifth lens, and a sixth lens disposed in order from the object side to the image side. As another example, the optical system may include a first lens, a second lens, a third lens, a fourth lens, a fifth lens, a sixth lens, and a seventh lens disposed in order from the object side to the image side. As another example, the optical system may include a first lens, a second lens, a third lens, a fourth lens, a fifth lens, a sixth lens, a seventh lens, and an eighth lens disposed in order from the object side to the image side.

The first lens group may include four or five lenses. The second lens group may include two or three lenses.

The optical system may include at least one aspherical lens. In an example embodiment, at least one of an object-side surface and an image-side surface of at least one of the lenses included in the optical system may be aspherical. In an example embodiment, at least one of the three lens groups included in the optical system may include at least one lens of which at least one of an object-side surface and an image-side surface is aspherical. In the example embodiment, an aspherical lens may refer to a lens of which at least one of an object-side surface and an image-side surface of the lens is aspherical.

The aspherical surface of the lens may be represented by Equation (1).

$$Z = \frac{cY^2}{1 + \sqrt{1 - (1+K)c^2Y^2}} + A \cdot Y^4 + \qquad \text{Equation 1}$$
$$B \cdot Y^6 + C \cdot Y^8 + D \cdot Y^{10} + E \cdot Y^{12} + F \cdot Y^{14} + G \cdot Y^{16}$$
$$+ H \cdot Y^{18} + J \cdot Y^{20} + L \cdot Y^{22} + M \cdot Y^{24} +$$
$$N \cdot Y^{26} + O \cdot Y^{28} + P \cdot Y^{30} + \dots$$

In Equation 1, c is a curvature of the lens, K is a conic constant, and Y represents a distance from an arbitrary point on the aspherical surface of the lens to the optical axis. Also, the constants A to H, J, and L to P refer to aspheric coefficients. Z represents the distance from an arbitrary point on the aspherical surface of the lens to an apex of the aspherical surface.

In an example embodiment, at least one of the object-side surface and the image-side surface of at least one of the lenses included in the optical system may include an inflection point. For example, at least one of the object-side surface and the image-side surface of the lens may be concave in the paraxial region and may be convex in the external region of the paraxial region. As another example, at least one of the object-side surface and the image-side surface of the lens may be convex in the paraxial region and concave in the external region of the paraxial region.

In example embodiments, the lens may be formed of a plastic material. In at least a portion of example embodiments, the lens may be formed of an injection molded plastic material. In example embodiments, an optical path changing element may be formed of glass or a plastic material. However, other transparent optical materials may be used. Also, in an example embodiment, the other elements of the lens elements may be formed of a material having different optical properties, such as different Abbe numbers and/or different refractive indexes.

In an example embodiment, the one or more lenses may have other shapes, such as, for example, an oval shape, a rectangular shape, a square shape, or a rectangular shape with rounded corners. In an example embodiment, the lens may have a D-cut shape. For example, a length of the lens in a first axis (Y axis) direction perpendicular to the optical axis (Z axis) may be smaller than a length in a second axis (X axis) direction perpendicular to both the optical axis and the first axis (Y axis) direction.

The optical system may be configured to satisfy at least one of conditional expressions as below:

$$G1\_OAL < 10 \text{ mm} \qquad \text{(Conditional Expression 1)}$$
$$1 < |1x\_f/f3| < 2 \qquad \text{(Conditional Expression 2)}$$
$$2 < |2x\_f/f3| < 3.8 \qquad \text{(Conditional Expression 3)}$$
$$0.7 < 1xL/2xL \qquad \text{(Conditional Expression 4)}$$
$$0.1 < 1xB/2xB \qquad \text{(Conditional Expression 5)}$$
$$0.5 < |G1F/G2F| < 1 \qquad \text{(Conditional Expression 6)}$$

G1_OAL is a thickness of the first lens group, and may be defined as a distance between an object-side apex of the lens most adjacent to the object side among the lenses included in the first lens group and an image-side apex of the lens most adjacent to the image side. 1x_f is a focal length of the optical system in the first position, and 2x_f is a focal length of the optical system in the second position and f3 is a focal length of the third lens of the optical system. 1xL is a distance from an object-side surface of the lens most adjacent to the object side among the at least one lens of the first lens group to the imaging plane in the first position, and 2xL is a distance from an object-side surface of the lens most adjacent to the object side among the at least one lens of the first lens group to the imaging plane in the second position. A thickness from the forwardmost lens to the rearmost lens may refer to a distance between an object-side apex of the forwardmost lens and an image-side apex of the rearmost lens. 1xB is a distance from an image-side apex of the last lens to the imaging plane IP in the first position, and 2xB is a distance from an image-side apex of the last lens to the imaging plane IP in the second position. G1F is a focal length of the first lens group, and G2F is a focal length of the second lens group.

The thicknesses of the lenses and the other elements, the distances between the adjacent ones of the lenses and the other elements, G1_OAL, 1xL, 2xL, 1xB, and 2xB are measured along the optical axis of the optical system.

Referring to the example embodiments illustrated in FIGS. 1A, 1B, 3A, 3B, 5A, 5B, 7A, and 7B, in an example embodiment, the optical systems may include first lenses 111, 311, 511, and 711, second lenses 112, 312, 512, and 712, third lenses 113, 313, 513, and 713, fourth lenses 114, 314, 514, and 714, fifth lenses 115, 315, 515, and 715, sixth lenses 121, 321, 521, and 721, seventh lenses 122, 322, 522, and 722, and image sensors 140, 340, 540, and 740, respectively, in a direction from the object side to the image side. The first lenses 111, 311, 511, and 711 to the fifth lenses 115, 315, 515, and 715 may be included in the first lens groups 110, 310, 510, and 710, respectively, and the sixth lenses 121, 321, 521, and 721 and the seventh lenses 122, 322, 522 and 722 may be included in the second lens group 120, 320, 520, and 720, respectively. The optical systems may further include aperture stops disposed between the fifth lenses 115, 315, 515, and 715 and the sixth lenses 121, 321, 521 and 721, respectively. The optical systems may further include IR filters 130, 330, 530, and 730 disposed between the seventh lenses 122, 322, 522, and 722 and the image sensors 140, 340, 540, and 740, respectively. The optical system may include seven lenses having refractive power.

The first lenses 111, 311, 511, and 711 may have negative refractive power. The object-side surfaces of the first lenses 111, 311, 511 and 711 may be convex in the paraxial region. The image-side surfaces of the first lenses 111, 311, 511 and 711 may be concave in the paraxial region. The object-side surfaces of the first lenses 111, 311, 511 and 711 may be aspherical. The image-side surfaces of the first lenses 111, 311, 511 and 711 may be aspherical.

The second lenses 112, 312, 512, and 712 may have positive refractive power. The object-side surfaces of the second lenses 112, 312, 512 and 712 may be convex in the paraxial region. The image-side surfaces of the second lenses 112, 312, 512 and 712 may be concave in the paraxial region. The object-side surfaces of the second lenses 112, 312, 512 and 712 may be aspherical. The image-side surfaces of the second lenses 112, 312, 512 and 712 may be aspherical.

The third lenses 113, 313, 513, and 713 may have negative refractive power. The object-side surfaces of the third lenses 113, 313, 513 and 713 may be concave in the paraxial region. The image-side surfaces of the third lenses 113, 313, 513 and 713 may be concave in the paraxial region. The object-side surfaces of the third lenses 113, 313, 513 and 713 may be aspherical. The image-side surfaces of the third lenses 113, 313, 513 and 713 may be aspherical.

The fourth lenses 114, 314, 514, and 714 may have positive refractive power. The object-side surfaces of the fourth lenses 114, 314, 514 and 714 may be convex in the paraxial region. The image-side surfaces of the fourth lenses 114, 314, 514 and 714 may be convex in the paraxial region. The object-side surfaces of the fourth lenses 114, 314, 514 and 714 may be aspherical. The image-side surfaces of the fourth lenses 114, 314, 514 and 714 may be aspherical.

The fifth lenses 115, 315, 515, and 715 may have positive refractive power. The object-side surfaces of the fifth lenses 115, 315, 515 and 715 may be concave in the paraxial region. The image-side surfaces of the fifth lenses 115, 315, 515 and 715 may be convex in the paraxial region. The object-side surfaces of the fifth lenses 115, 315, 515 and 715 may be aspherical. The image-side surfaces of the fifth lenses 115, 315, 515 and 715 may be aspherical.

The sixth lenses 121, 321, 521, and 721 may have positive refractive power. The object-side surfaces of the sixth lenses 121, 321, 521 and 721 may be concave in the paraxial region. The image-side surfaces of the sixth lenses 121, 321, 521 and 721 may be convex in the paraxial region. The object-side surfaces of the sixth lenses 121, 321, 521 and 721 may be aspherical. The image-side surfaces of the sixth lenses 121, 321, 521 and 721 may be aspherical.

The seventh lenses 122, 322, 522, and 722 may have negative refractive power. The object-side surfaces of the seventh lenses 122, 322, 522 and 722 may be concave in the paraxial region. The image-side surfaces of the seventh lenses 122, 322, 522 and 722 may be concave or convex in the paraxial region. The object-side surfaces of the seventh lenses 122, 322, 522, and 722 may be aspherical. The image-side surfaces of the seventh lenses 122, 322, 522 and 722 may be aspherical.

Referring to the example embodiments illustrated in FIGS. 4A, 4B, 6A, and 6B, the optical systems 400 and 600 may include two lens groups, and image sensors 440 and 640, respectively. The first lens groups 410 and 610 may include first to fifth lenses 411, 611, 412, 612, 413, 613, 414, 614, 415, and 615, and the second lens groups 420 and 620 may include sixth to eighth lenses 421, 621, 422, 622, 423, and 623, respectively. The optical systems 400 and 600 may include aperture stops disposed between the fifth lenses 415 and 615 and the sixth lenses 421 and 621, respectively. The optical systems 400 and 600 may include IR filters 430 and 630 disposed between the eighth lenses 423 and 623 and the image sensors 440 and 640, respectively. The optical systems 400 and 600 may include eight lenses having refractive power.

The first lenses 411 and 611 may have positive refractive power. The first lenses 411 and 611 may have a meniscus shape convex toward the object side or the image side. The object-side surfaces of the first lenses 411 and 611 may be aspherical. The image-side surfaces of the first lenses 411 and 611 may be aspherical.

The second lenses 412 and 612 may have positive refractive power. The object-side surfaces of the second lenses 412 and 612 may be convex in the paraxial region. The image-side surfaces of the second lenses 412 and 612 may be concave in the paraxial region. The object-side surfaces of the second lenses 412 and 612 may be aspherical. The image-side surfaces of the second lenses 412 and 612 may be aspherical.

The third lenses 413 and 613 may have negative refractive power. The object-side surfaces of the third lenses 413 and 613 may be concave in the paraxial region. The image-side surfaces of the third lenses 413 and 613 may be concave in the paraxial region. The object-side surfaces of the third lenses 413 and 613 may be aspherical. The image-side surfaces of the third lenses 413 and 613 may be aspherical.

The fourth lenses 414 and 614 may have positive refractive power. The object-side surfaces of the fourth lenses 414 and 614 may be convex or concave in the paraxial region. The image-side surfaces of the fourth lenses 414 and 614 may be convex in the paraxial region. The object-side surfaces of the fourth lenses 414 and 614 may be aspherical. The image-side surfaces of the fourth lenses 414 and 614 may be aspherical.

The fifth lenses 415 and 615 may have positive refractive power. The object-side surfaces of the fifth lenses 415 and 615 may be convex in the paraxial region. The image-side surfaces of the fifth lenses 415 and 615 may be concave or convex in the paraxial region. The object-side surfaces of the fifth lenses 415 and 615 may be aspherical. The image-side surfaces of the fifth lenses 415 and 615 may be aspherical.

The sixth lenses 421 and 621 may have positive refractive power. The object-side surfaces of the sixth lenses 421 and 621 may be concave in the paraxial region. The image-side surfaces of the sixth lenses 421 and 621 may be convex in the paraxial region. The object-side surfaces of the sixth lenses 421 and 621 may be aspherical. The image-side surfaces of the sixth lenses 421 and 621 may be aspherical.

The seventh lenses 422 and 622 may have positive refractive power. The object-side surfaces of the seventh lenses 422 and 622 may be concave in the paraxial region. The image-side surfaces of the seventh lenses 422 and 622 may be convex in the paraxial region. The object-side surfaces of the seventh lenses 422 and 622 may be aspherical. The image-side surfaces of the seventh lenses 422 and 622 may be aspherical.

The eighth lenses 423 and 623 may have negative refractive power. The object-side surfaces of the eighth lenses 423 and 623 may be concave in the paraxial region. The image-side surfaces of the eighth lenses 423 and 623 may be convex in the paraxial region. The object-side surfaces of the eighth lenses 423 and 623 may be aspherical. The image-side surfaces of the eighth lenses 423 and 623 may be aspherical.

Hereinafter, an optical system 100 will be described according to a first example embodiment with reference to FIGS. 1A to 10.

Figure 1B:
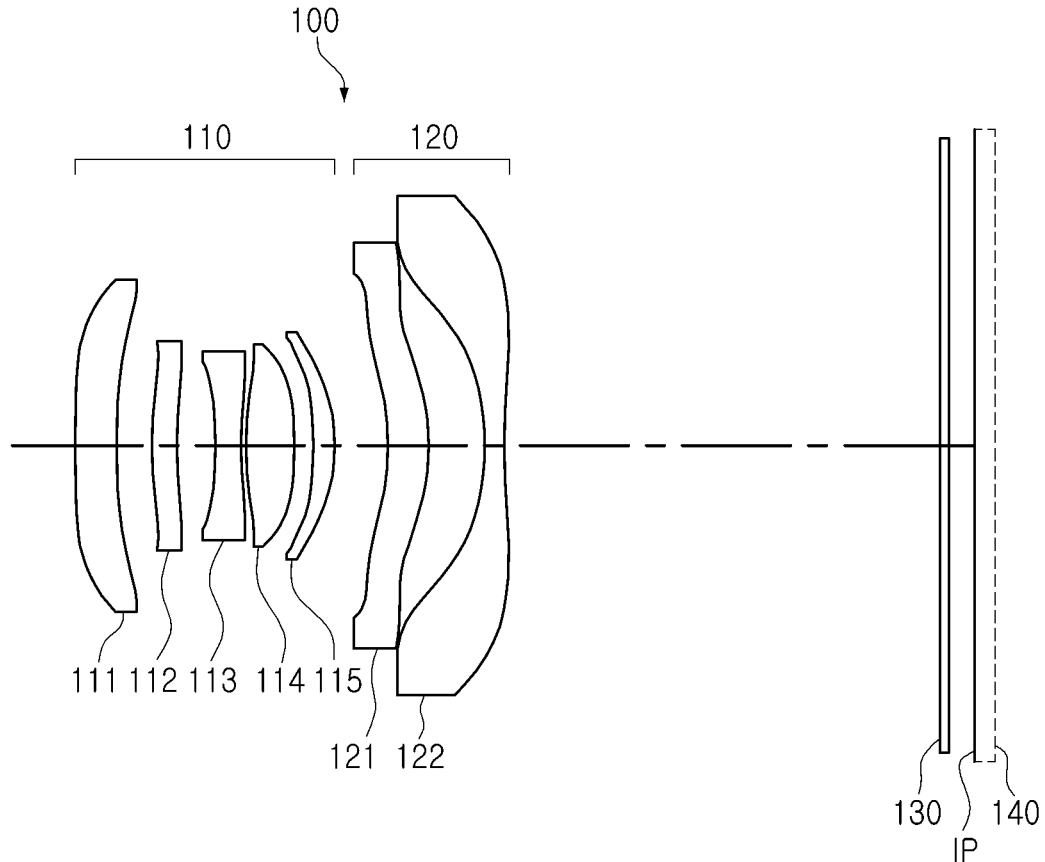
FIG. 1B is a cross-sectional diagram illustrating an optical system in a second position according to a first example embodiment of the present disclosure.
Figure 1C:
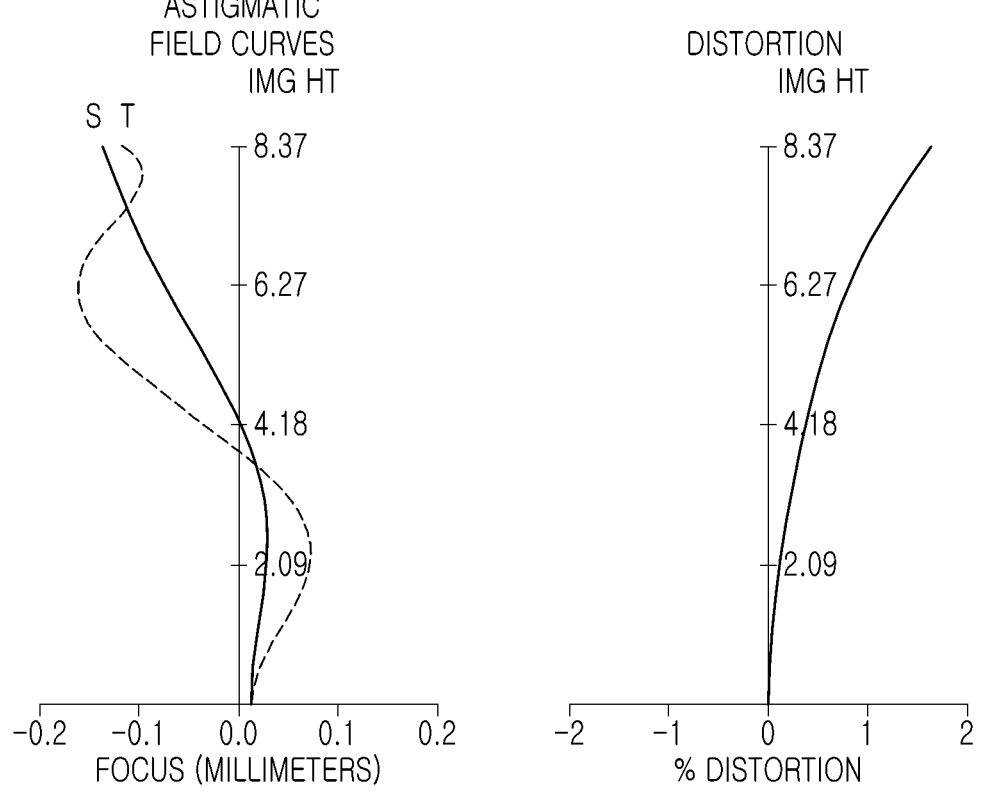
FIG. 1C depicts graphs illustrating aberration properties of an optical system according to a first example embodiment of the present disclosure.

FIG. 1A is a cross-sectional diagram illustrating an optical system 100 in a first position according to a first example embodiment. FIG. 1B is a cross-sectional diagram illustrating an optical system 100 in a second position according to a first example embodiment. FIG. 1C depicts graphs illustrating aberration properties of an optical system 100 according to a first example embodiment.

The optical system 100 may include two lens groups, and an image sensor 140. The first lens group 110 may include first to fifth lenses 111, 112, 113, 114, and 115, and the second lens group 120 may include a sixth lens 121 and a seventh lens 122.

As the first lens group 110 and the second lens group 120 move in the optical axis direction with respect to the image sensor 140, the magnification of the optical system 100 may change. The magnification in the first position may be approximately twice the magnification in the second position.

The focal length may be 10.4 mm in the first position, and may be 20.2 mm in the second position. The F-number may be 2.3 in the first position and may be 4.6 in the second position. A half of the length of the diagonal of the imaging plane IP of the image sensor 140 may be 8.166 mm.

The first lens group 110 may have positive refractive power, and the second lens group 120 may have negative refractive power. The focal length of the first lens group 110 may be 8.64 mm, and the focal length of the second lens group 120 may be −9.96 mm.

The optical system 100 may include an aperture stop disposed between the fifth lens 115 and the sixth lens 121. The optical system 100 may include an IR filter 130 disposed between the seventh lens 122 and the image sensor 140. The optical system 100 may include seven lenses having refractive power. Two lenses adjacent to each other among the lenses of the optical system 100 may be spaced apart from each other in the optical axis direction.

The first lens 111 may have negative refractive power. The object-side surface of the first lens 111 may be convex in the paraxial region. The image-side surface of the first lens 111 may be concave in the paraxial region. The object-side surface of the first lens 111 may be aspherical. The image-side surface of the first lens 111 may be aspherical.

The second lens 112 may have positive refractive power. The object-side surface of the second lens 112 may be convex in the paraxial region. The image-side surface of the second lens 112 may be concave in the paraxial region. The object-side surface of the second lens 112 may be aspherical. The image-side surface of the second lens 112 may be aspherical.

The third lens 113 may have negative refractive power. The object-side surface of the third lens 113 may be concave in the paraxial region. The image-side surface of the third lens 113 may be concave in the paraxial region. The object-side surface of the third lens 113 may be aspherical. The image-side surface of the third lens 113 may be aspherical.

The fourth lens 114 may have positive refractive power. The object-side surface of the fourth lens 114 may be convex in the paraxial region. The image-side surface of the fourth lens 114 may be convex in the paraxial region. The object-side surface of the fourth lens 114 may be aspherical. The image-side surface of the fourth lens 114 may be aspherical.

The fifth lens 115 may have positive refractive power. The object-side surface of the fifth lens 115 may be concave in the paraxial region. The image-side surface of the fifth lens 115 may be convex in the paraxial region. The object-side surface of the fifth lens 115 may be aspherical. The image-side surface of the fifth lens 115 may be aspherical.

The sixth lens 121 may have positive refractive power. The object-side surface of the sixth lens 121 may be concave in the paraxial region. The image-side surface of the sixth lens 121 may be convex in the paraxial region. The object-side surface of the sixth lens 121 may be aspherical. The image-side surface of the sixth lens 121 may be aspherical.

The seventh lens 122 may have negative refractive power. The object-side surface of the seventh lens 122 may be concave in the paraxial region. The image-side surface of the seventh lens 122 may be concave in the paraxial region. The object-side surface of the seventh lens 122 may be aspherical. The image-side surface of the seventh lens 122 may be aspherical.

The image-side surface of the first lens 111 may include an inflection point.

The object-side surface of the second lens 112 may include an inflection point. The object-side surface of the second lens 112 may be convex in the paraxial region and may be concave in the external region of the paraxial region.

The image-side surface of the third lens 113 may include an inflection point. The image-side surface of the third lens 113 may be concave in the paraxial region and may be convex in the external region of the paraxial region.

The object-side surface of the sixth lens 121 may include an inflection point. The image-side surface of the sixth lens 121 may include an inflection point.

The object-side surface of the seventh lens 122 may include an inflection point. The image-side surface of the seventh lens 122 may include an inflection point. The image-side surface of the seventh lens 122 may be concave in the paraxial region and may be convex in the external region of the paraxial region.

In the optical system 100 in the first example embodiment, G1_OAL may be 6.738, $|1x\_f/f3|$ may be 1.096, $|2x\_f/f3|$ may be 2.129, 1xL/2xL may be 0.713, 1xB/2xB may be 0.115, and $|G1F/G2F|$ may be 0.868.

Table 1 lists optical and physical parameters of the optical system 100 in the first example embodiment. Table 2 lists aspherical data of the optical system 100 in the first example embodiment.

TABLE 1

| optical element | Surface # | Radius | Thickness (Position 1) | Thickness (Position 2) | Index | Abbe # |
|---|---|---|---|---|---|---|
| | Object | Infinity | Infinity | Infinity | | |
| | 1 | Infinity | 0.000 | 0.000 | | |
| 1st lens | 2 | 95.069 | 1.079 | 1.079 | 1.535 | 56.1 |
| | 3 | 44.709 | 0.908 | 0.908 | | |
| 2nd lens | 4 | 10.490 | 0.650 | 0.650 | 1.650 | 21.0 |
| | 5 | 14.768 | 1.000 | 1.000 | | |
| 3rd lens | 6 | −14.225 | 0.671 | 0.671 | 1.635 | 23.0 |
| | 7 | 10.850 | 0.118 | 0.118 | | |
| 4th lens | 8 | 7.315 | 1.273 | 1.273 | 1.535 | 56.1 |
| | 9 | −9.927 | 0.481 | 0.481 | | |
| 5th lens | 10 | −9.494 | 0.558 | 0.558 | 1.535 | 56.1 |
| | 11 | −4.174 | 0.800 | 0.800 | | |
| aperture stop | 12 | Infinity | 4.743 | 0.558 | | |
| 6th lens | 13 | −6.165 | 1.057 | 1.057 | 1.750 | 34.0 |
| | 14 | −4.829 | 1.447 | 1.447 | | |
| 7th lens | 15 | −6.920 | 0.500 | 0.500 | 1.650 | 55.0 |
| | 16 | 13.461 | 0.500 | 11.391 | | |
| filter | 17 | Infinity | 0.210 | 0.210 | 1.518 | 64.2 |
| | 18 | Infinity | 0.712 | 0.712 | | |
| imaging plane | Image | Infinity | −0.012 | −0.012 | | |

TABLE 2

| Surface # | 2 | 3 | 4 | 5 | 6 | 7 | 8 |
|---|---|---|---|---|---|---|---|
| Y radius | 9.5069E+01 | 4.4709E+01 | 1.0490E+01 | 1.4768E+01 | -1.4225E+01 | 1.0850E+01 | 7.3150E+00 |
| conic constant (K) | 9.9000E+01 | 9.8404E+01 | -4.3730E+01 | -3.2686E+01 | 3.5049E+01 | -8.9463E+01 | -1.1014E+01 |
| 4th coefficient (A) | 8.0332E-01 | 3.3606E-01 | -1.8993E-02 | -9.9161E-03 | -3.5126E-02 | -2.2478E-02 | -5.4681E-02 |
| 6th coefficient (B) | 4.3805E-02 | -6.7681E-02 | -2.8202E-02 | -5.9002E-03 | -5.1307E-04 | -3.6775E-03 | -1.0240E-03 |
| 8th coefficient (C) | 5.2151E-03 | -7.8612E-03 | 1.0955E-03 | -3.3431E-04 | -5.4440E-04 | -5.2316E-05 | -8.7277E-04 |
| 10th coefficient (D) | -8.6819E-04 | 1.4104E-03 | 7.2242E-04 | 1.9765E-04 | 1.1087E-04 | -7.1153E-05 | 2.1666E-05 |
| 12th coefficient (E) | -2.1753E-03 | 7.2829E-05 | 1.1081E-04 | 2.3107E-05 | -1.4233E-05 | 4.4869E-05 | 2.7837E-05 |
| 14th coefficient (F) | -4.9061E-04 | 4.0814E-04 | -3.9319E-05 | -3.8904E-06 | 9.4622E-06 | -1.1207E-05 | -8.0924E-06 |
| 16th coefficient (G) | -2.4421E-04 | -2.2666E-05 | 6.1116E-06 | -2.4224E-06 | -2.9097E-06 | 2.4394E-06 | 4.7237E-06 |
| 18th coefficient (H) | -9.4343E-05 | -1.0253E-04 | -1.8252E-06 | 9.3625E-07 | 6.8498E-08 | -5.2183E-07 | -1.1079E-06 |
| 20th coefficient (J) | 3.9891E-05 | 2.2737E-05 | 1.8715E-07 | -9.1957E-08 | 9.9071E-08 | 4.6964E-08 | 6.6615E-08 |

| Surface # | 9 | 10 | 11 | 13 | 14 | 15 | 16 |
|---|---|---|---|---|---|---|---|
| Y radius | -9.9275E+00 | -9.4935E+00 | -4.1741E+00 | -6.1652E+00 | -4.8293E+00 | -6.9199E+00 | 1.3461E+01 |
| conic constant (K) | 1.0244E+01 | 6.2199E+00 | -1.8878E+00 | 3.8936E-01 | -1.5938E+00 | 2.9115E-01 | -4.5636E+00 |
| 4th coefficient (A) | -1.5368E-01 | -1.2637E-01 | -1.9996E-02 | 1.5989E+00 | 1.7526E+00 | -1.3132E-01 | -2.9760E+00 |
| 6th coefficient (B) | -1.1054E-02 | 5.0470E-04 | 1.2246E-02 | -1.7064E-01 | -1.7681E-01 | 4.2361E-01 | 2.2264E-01 |
| 8th coefficient (C) | 2.6698E-03 | 1.4803E-02 | 7.2330E-03 | -8.5672E-02 | -5.8037E-02 | 8.0369E-02 | -5.2663E-02 |
| 10th coefficient (D) | -4.8137E-05 | -3.3508E-04 | -3.7263E-03 | -1.9243E-02 | 7.2627E-03 | -4.2234E-02 | 5.1517E-02 |
| 12th coefficient (E) | -5.5320E-05 | -1.4818E-03 | -2.6036E-03 | -2.9827E-04 | 2.4172E-02 | 8.4567E-03 | -8.6508E-03 |
| 14th coefficient (F) | 9.1808E-06 | -1.0599E-04 | 1.1017E-04 | -3.9872E-03 | -6.1663E-03 | -5.9648E-03 | -6.1306E-03 |
| 16th coefficient (G) | -6.3876E-06 | 9.1408E-05 | 2.1466E-04 | -3.1401E-03 | -3.8977E-03 | 1.5894E-03 | 4.0698E-03 |
| 18th coefficient (H) | 3.4472E-06 | 3.0656E-05 | -1.6670E-05 | -1.0592E-03 | 1.6659E-03 | -8.2069E-04 | -7.4376E-04 |
| 20th coefficient (J) | -4.9792E-07 | -1.6995E-05 | -4.2731E-05 | -1.1095E-03 | -2.7346E-04 | 2.3542E-04 | 5.3248E-03 |

Hereinafter, an optical system 200 will be described according to a second example embodiment with reference to FIGS. 2A to 2C.

Figure 2A:
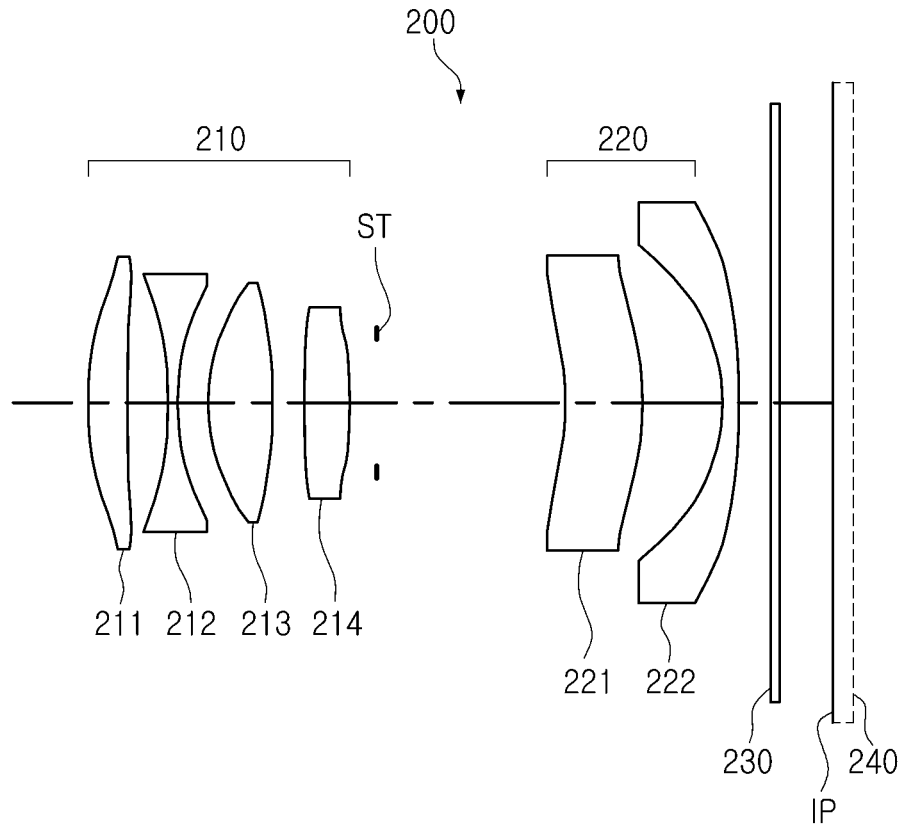
FIG. 2A is a cross-sectional diagram illustrating an optical system in a first position according to a second example embodiment of the present disclosure.
Figure 2B:
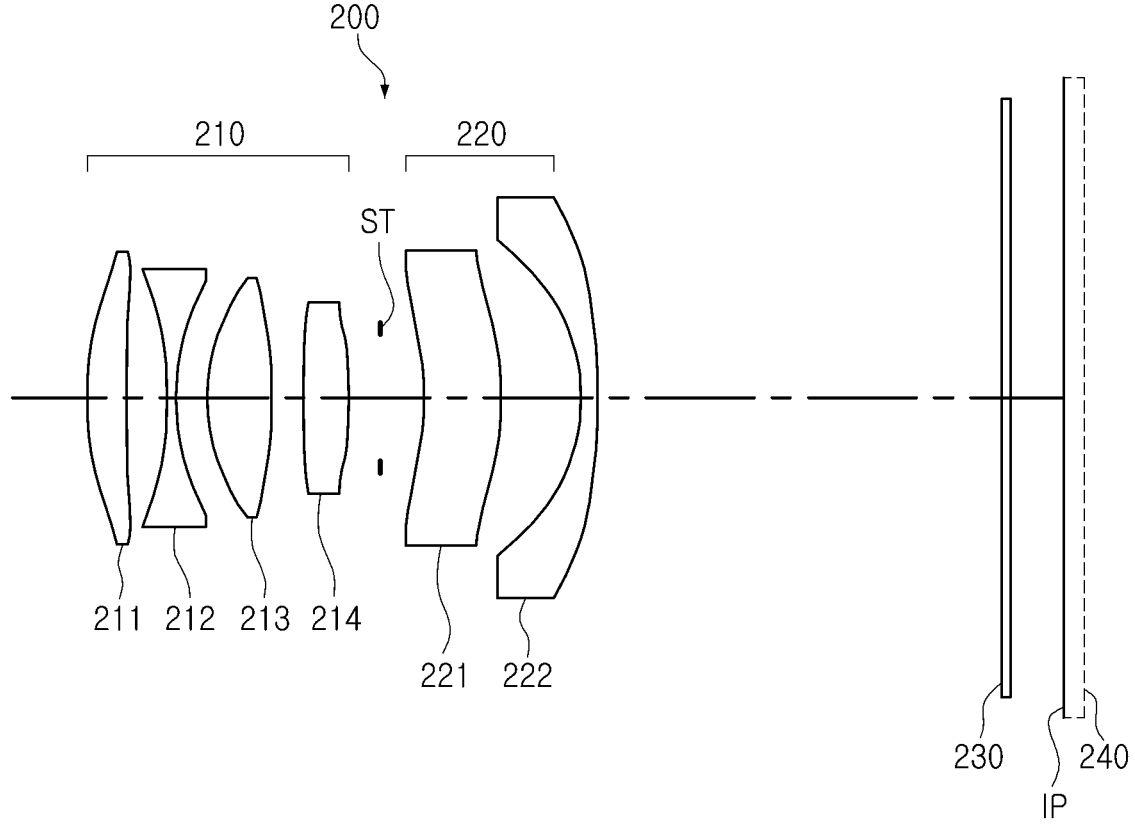
FIG. 2B is a cross-sectional diagram illustrating an optical system in a second position according to a second example embodiment of the present disclosure.
Figure 2C:
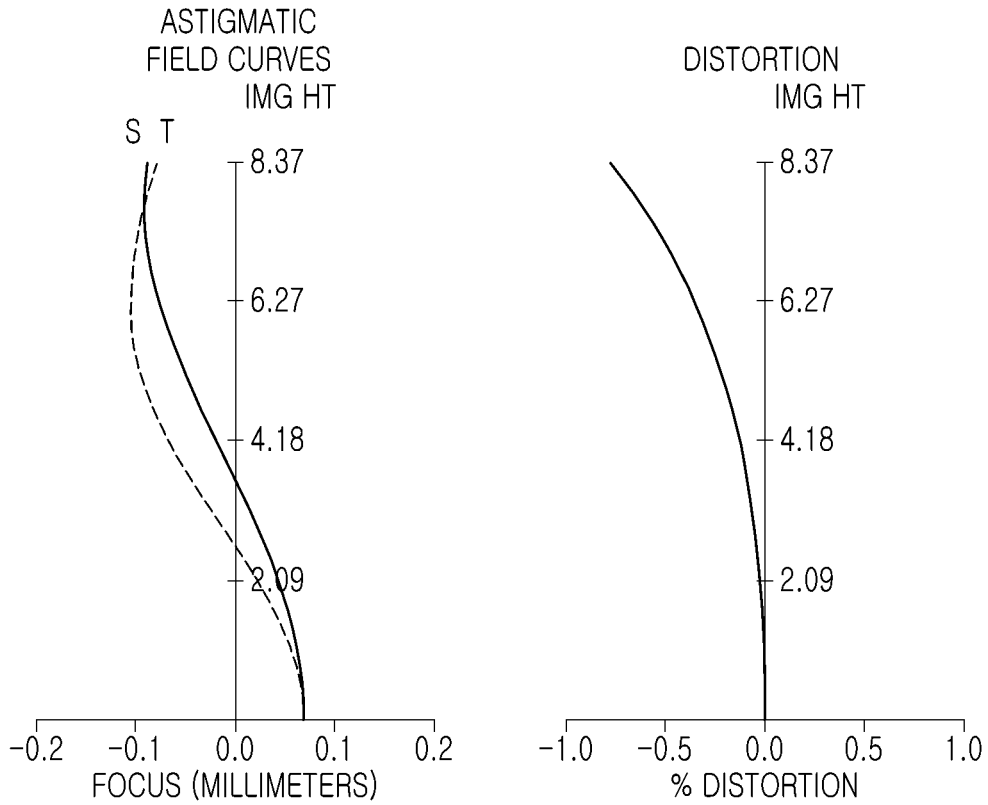
FIG. 2C depicts graphs illustrating aberration properties of an optical system according to a second example embodiment of the present disclosure.

FIG. 2A is a cross-sectional diagram illustrating an optical system 200 in a first position according to a second example embodiment. FIG. 2B is a cross-sectional diagram illustrating an optical system 200 in a second position according to a second example embodiment. FIG. 2C depicts graphs illustrating aberration properties of an optical system 200 according to a second example embodiment.

The optical system 200 may include two lens groups, and an image sensor 240. The first lens group 210 may include first to fourth lenses 211, 212, 213, and 214, and the second lens group 220 may include a fifth lens 221 and a sixth lens 222.

As the first lens group 210 and the second lens group 220 move in the optical axis direction with respect to the image sensor 240, the magnification of the optical system 200 may change. The magnification in the first position may be approximately twice the magnification in the second position.

The focal length may be 13.4 mm in the first position, and may be 25.5 mm in the second position. The F-number may be 3.9 in the first position and may be 7.3 in the second position. A half of the length of the diagonal of the imaging plane IP of the image sensor 240 may be 8.166 mm.

The first lens group 210 may have positive refractive power, and the second lens group 220 may have negative refractive power. The focal length of the first lens group 210 may be 10.24 mm, and the focal length of the second lens group 220 may be −10.25 mm.

The optical system 200 may include an aperture stop ST disposed between the fourth lens 214 and the fifth lens 221. The optical system 200 may include an IR filter 230 disposed between the sixth lens 222 and the image sensor 240. The optical system 200 may include six lenses having refractive power. Two lenses adjacent to each other among the lenses of the optical system 200 may be spaced apart from each other in the optical axis direction.

The first lens 211 may have negative refractive power. The object-side surface of the first lens 211 may be convex in the paraxial region. The image-side surface of the first lens 211 may be concave in the paraxial region. The object-side surface of the first lens 211 may be aspherical. The image-side surface of the first lens 211 may be aspherical.

The second lens 212 may have negative refractive power. The object-side surface of the second lens 212 may be concave in the paraxial region. The image-side surface of the second lens 212 may be concave in the paraxial region. The object-side surface of the second lens 212 may be aspherical. The image-side surface of the second lens 212 may be aspherical.

The third lens 213 may have positive refractive power. The object-side surface of the third lens 213 may be convex in the paraxial region. The image-side surface of the third lens 213 may be convex in the paraxial region. The object-side surface of the third lens 213 may be aspherical. The image-side surface of the third lens 213 may be aspherical.

The fourth lens 214 may have positive refractive power. The object-side surface of the fourth lens 214 may be convex in the paraxial region. The image-side surface of the fourth lens 214 may be convex in the paraxial region. The object-side surface of the fourth lens 214 may be aspherical. The image-side surface of the fourth lens 214 may be aspherical.

The fifth lens 221 may have positive refractive power. The object-side surface of the fifth lens 221 may be concave in the paraxial region. The image-side surface of the fifth lens 221 may be convex in the paraxial region. The object-side surface of the fifth lens 221 may be aspherical. The image-side surface of the fifth lens 221 may be aspherical.

The sixth lens 222 may have negative refractive power. The object-side surface of the sixth lens 222 may be concave in the paraxial region. The image-side surface of the sixth lens 222 may be convex in the paraxial region. The object-side surface of the sixth lens 222 may be aspherical. The image-side surface of the sixth lens 222 may be aspherical.

The object-side surface of the first lens 211 may include an inflection point. The image-side surface of the first lens 211 may include an inflection point. The image-side surface of the first lens 211 may be concave in the paraxial region and may be convex in the external region of the paraxial region.

The object-side surface of the fifth lens 221 may include an inflection point.

In the second example embodiment, G1_OAL may be 6.723, |1x_f/f3| may be 1.951, |2x_f/f3| may be 3.712, 1xL/2xL may be 0.697, 1xB/2xB may be 0.166, and |G1F/G2F| may be 1.

Table 3 lists optical and physical parameters of the optical system 200 in the second example embodiment.

Table 4 lists aspherical data of the optical system 200 in the second example embodiment.

trating aberration properties of an optical system 300 according to a third example embodiment.

The optical system 300 may include two lens groups, and an image sensor 340. The first lens group 310 may include first to fifth lenses 311, 312, 313, 314, and 315, and the second lens group 320 may include a sixth lens 321 and a seventh lens 322.

As the first lens group 310 and the second lens group 320 move in the optical axis direction with respect to the image sensor 340, the magnification of the optical system 300 may Table 3

| optical element | Surface # | Radius | Thickness (Position 1) | Thickness (Position 2) | Index | Abbe # |
|---|---|---|---|---|---|---|
| | Object | Infinity | Infinity | Infinity | | |
| | 1 | Infinity | 0.000 | 0.000 | | |
| 1st lens | 2 | 8.267 | 1.009 | 1.009 | 1.490 | 68.0 |
| | 3 | 36.557 | 1.048 | 1.048 | | |
| 2nd lens | 4 | −9.464 | 0.230 | 0.230 | 1.740 | 45.0 |
| | 5 | 6.137 | 0.800 | 0.800 | | |
| 3rd lens | 6 | 4.990 | 1.659 | 1.659 | 1.535 | 56.1 |
| | 7 | −11.422 | 0.800 | 0.800 | | |
| 4th lens | 8 | 27.792 | 1.176 | 1.176 | 1.535 | 56.1 |
| | 9 | −9.128 | 0.800 | 0.800 | | |
| aperture stop | 10 | Infinity | 4.796 | 1.102 | | |
| 5th lens | 11 | −8.242 | 1.992 | 1.992 | 1.680 | 18.4 |
| | 12 | −6.964 | 2.044 | 2.044 | | |
| 6th lens | 13 | −5.100 | 0.414 | 0.414 | 1.740 | 45.0 |
| | 14 | −25.605 | 0.800 | 12.836 | | |
| filter | 15 | Infinity | 0.210 | 0.210 | 1.518 | 64.2 |
| | 16 | Infinity | 1.450 | 1.450 | | |
| imaging plane | Image | Infinity | −0.069 | −0.069 | | |

TABLE 4

| Surface # | 2 | 3 | 4 | 5 | 6 | 7 |
|---|---|---|---|---|---|---|
| Y radius | 8.2673E+00 | 3.6557E+01 | −9.4641E+00 | 6.1365E+00 | 4.9896E+00 | −1.1422E+01 |
| conic constant (K) | −2.0709E−01 | −3.1349E+01 | 1.7820E−02 | −2.8938E−01 | −4.8657E−01 | −5.4028E−01 |
| 4th coefficient (A) | −1.9805E−04 | −1.4605E−04 | 8.4958E−05 | −1.4810E−04 | −8.6862E−05 | 2.2929E−04 |
| 6th coefficient (B) | −1.2781E−05 | −7.4899E−06 | 1.6535E−06 | −2.0195E−06 | −5.0153E−06 | 8.3393E−06 |
| 8th coefficient (C) | −6.2005E−07 | −1.0618E−06 | 1.0908E−07 | −3.7003E−07 | 7.0221E−08 | 8.5426E−07 |
| 10th coefficient (D) | −2.3905E−08 | −6.1086E−08 | 7.5468E−09 | −4.6564E−08 | 1.0902E−08 | 5.5089E−08 |
| 12th coefficient (E) | −1.8213E−09 | 3.2191E−09 | 1.3404E−09 | −1.5161E−09 | 1.9776E−09 | −5.9428E−10 |
| 14th coefficient (F) | −3.7266E−10 | 1.4521E−10 | 1.6934E−11 | 4.4510E−10 | −7.3162E−10 | 8.7509E−10 |
| 16th coefficient (G) | 1.6448E−11 | −1.6442E−11 | −2.1590E−11 | −5.1964E−11 | 1.1698E−10 | −1.8203E−11 |
| 18th coefficient (H) | −7.4900E−14 | −4.0941E−22 | 2.9426E−13 | −2.4959E−23 | 9.7686E−24 | 1.1312E−22 |
| 20th coefficient (J) | 1.1286E−23 | −1.8210E−24 | 2.7311E−23 | 1.3882E−24 | 1.4493E−24 | 1.5698E−24 |

| Surface # | 8 | 9 | 11 | 13 | 14 | 15 |
|---|---|---|---|---|---|---|
| Y radius | 2.7792E+01 | −9.1282E+00 | −8.2420E+00 | −6.9635E+00 | −5.0996E+00 | −2.5605E+01 |
| conic constant (K) | −1.9543E+01 | −2.3284E+00 | −3.8724E+00 | −2.9784E+00 | 1.8247E−01 | 1.4501E+01 |
| 4th coefficient (A) | −3.6253E−04 | 2.6318E−04 | 1.0524E−03 | 8.3226E−04 | 3.2148E−05 | −9.4855E−04 |
| 6th coefficient (B) | 1.6436E−05 | 5.3182E−05 | 2.7617E−05 | 1.6409E−05 | −5.4929E−05 | 9.3188E−06 |
| 8th coefficient (C) | 6.5243E−06 | 1.0996E−05 | 6.3947E−08 | 1.7984E−06 | 2.6374E−06 | 9.3069E−08 |
| 10th coefficient (D) | 2.0362E−06 | 1.9426E−06 | 5.9970E−08 | −3.2953E−10 | 8.2654E−08 | 2.4450E−09 |
| 12th coefficient (E) | −6.1707E−09 | 2.0751E−18 | −4.1690E−09 | −2.7276E−09 | 1.6490E−09 | 3.3708E−11 |
| 14th coefficient (F) | 7.6776E−20 | 7.4799E−20 | −2.0540E−10 | −6.0424E−11 | −1.4225E−10 | 3.6427E−13 |
| 16th coefficient (G) | 2.0697E−21 | 2.0674E−21 | 2.0038E−11 | 1.0122E−11 | 2.4135E−12 | −1.2141E−15 |
| 18th coefficient (H) | 5.5858E−23 | 5.5864E−23 | 6.6665E−23 | 3.6963E−14 | 2.6902E−13 | −1.1227E−15 |
| 20th coefficient (J) | 1.5061E−24 | 1.5062E−24 | 1.9811E−24 | 9.1240E−25 | 2.7493E−15 | −8.5500E−17 |

Hereinafter, an optical system 300 will be described according to a third example embodiment with reference to FIGS. 3A to 3C.

Figure 3A:
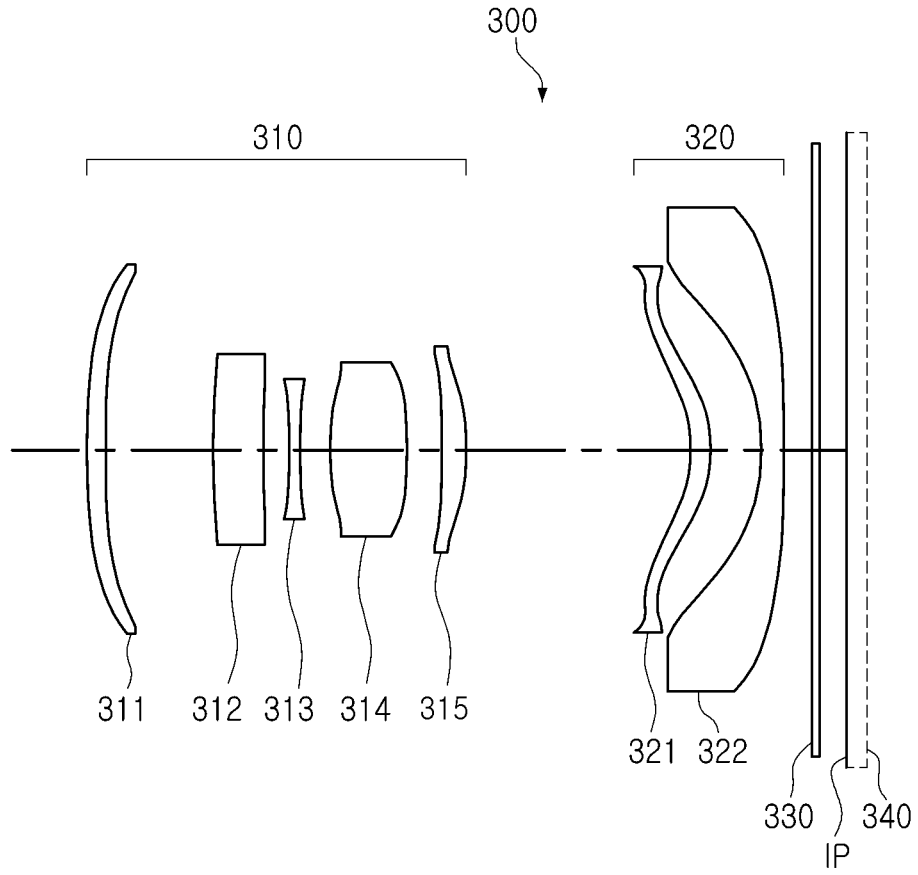
FIG. 3A is a cross-sectional diagram illustrating an optical system in a first position according to a third example embodiment of the present disclosure.
Figure 3B:
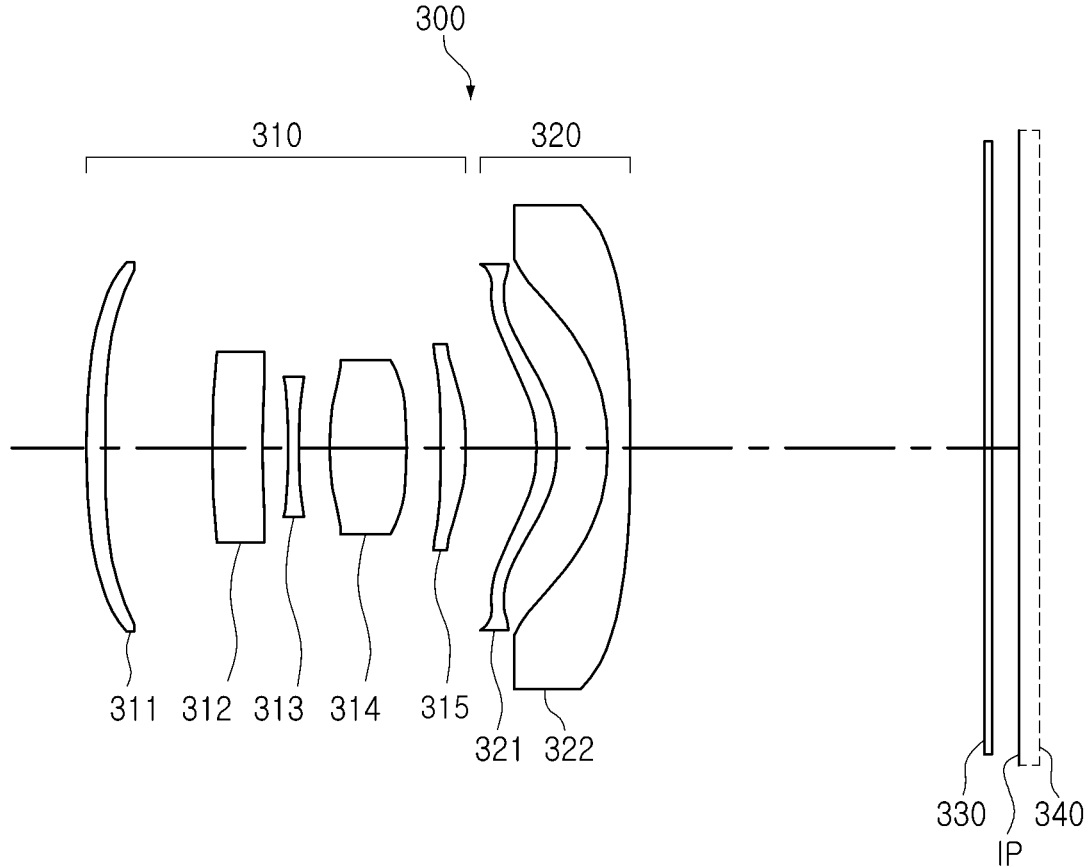
FIG. 3B is a cross-sectional diagram illustrating an optical system in a second position according to a third example embodiment of the present disclosure.
Figure 3C:
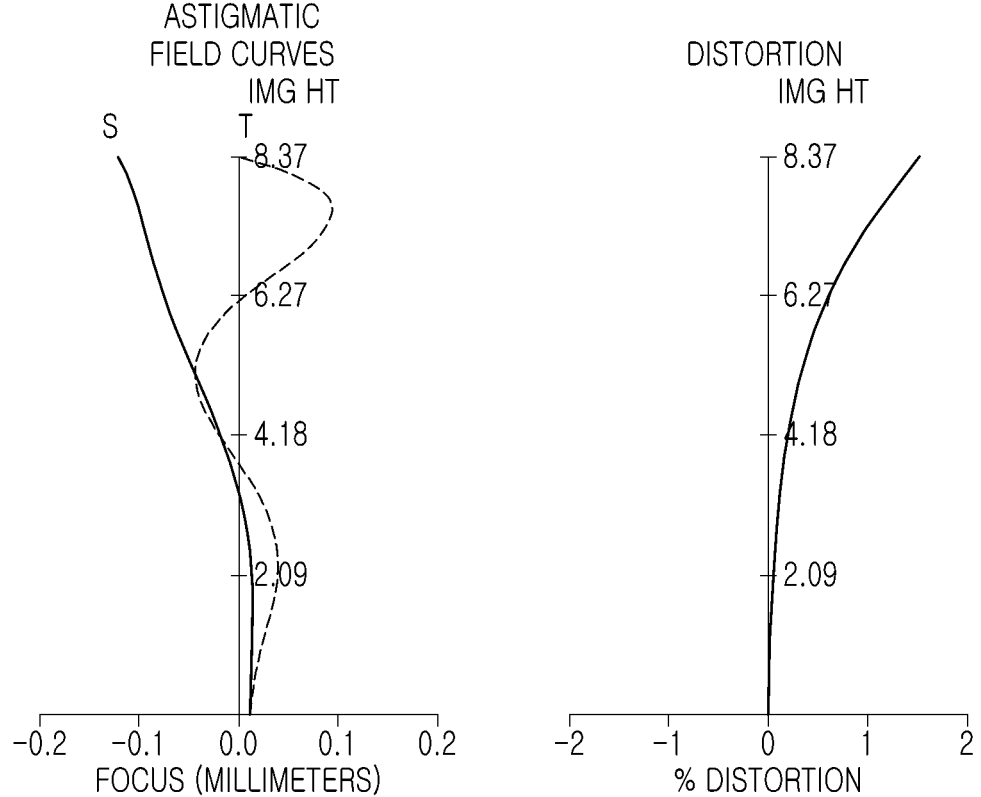
FIG. 3C depicts graphs illustrating aberration properties of an optical system according to a third example embodiment of the present disclosure.

FIG. 3A is a cross-sectional diagram illustrating an optical system 300 in a first position according to a third example embodiment. FIG. 3B is a cross-sectional diagram illustrating an optical system 300 in a second position according to a third example embodiment. FIG. 3C depicts graphs illuschange. The magnification in the first position may be approximately twice the magnification in the second position.

The focal length may be 10.3 mm in the first position, and may be 20.6 mm in the second position. The F-number may be 2.8 in the first position and may be 5.6 in the second position. A half the length of the diagonal of the imaging plane IP of the image sensor 340 may be 8.166 mm.

The first lens group 310 may have positive refractive power, and the second lens group 320 may have negative refractive power. The focal length of the first lens group 310 may be 8.44 mm, and the focal length of the second lens group 320 may be −9.58 mm.

The optical system 300 may include an aperture stop disposed between the fifth lens 315 and the sixth lens 321. The optical system 300 may include an IR filter 330 disposed between the seventh lens 322 and the image sensor 340. The optical system 300 may include seven lenses having refractive power. Two lenses adjacent to each other among the lenses of the optical system 300 may be spaced apart from each other in the optical axis direction.

The first lens 311 may have negative refractive power. The object-side surface of the first lens 311 may be convex in the paraxial region. The image-side surface of the first lens 311 may be concave in the paraxial region. The object-side surface of the first lens 311 may be aspherical. The image-side surface of the first lens 311 may be aspherical.

The second lens 312 may have positive refractive power. The object-side surface of the second lens 312 may be convex in the paraxial region. The image-side surface of the second lens 312 may be concave in the paraxial region. The object-side surface of the second lens 312 may be aspherical. The image-side surface of the second lens 312 may be aspherical.

The third lens 313 may have negative refractive power. The object-side surface of the third lens 313 may be concave in the paraxial region. The image-side surface of the third lens 313 may be concave in the paraxial region. The object-side surface of the third lens 313 may be aspherical. The image-side surface of the third lens 313 may be aspherical.

The fourth lens 314 may have positive refractive power. The object-side surface of the fourth lens 314 may be convex in the paraxial region. The image-side surface of the fourth lens 314 may be convex in the paraxial region. The object-side surface of the fourth lens 314 may be aspherical. The image-side surface of the fourth lens 314 may be aspherical.

The fifth lens 315 may have positive refractive power. The object-side surface of the fifth lens 315 may be concave in the paraxial region. The image-side surface of the fifth lens 315 may be convex in the paraxial region. The object-side surface of the fifth lens 315 may be aspherical. The image-side surface of the fifth lens 315 may be aspherical.

The sixth lens 321 may have positive refractive power. The object-side surface of the sixth lens 321 may be concave in the paraxial region. The image-side surface of the sixth lens 321 may be convex in the paraxial region. The object-side surface of the sixth lens 321 may be aspherical. The image-side surface of the sixth lens 321 may be aspherical.

The seventh lens 322 may have negative refractive power. The object-side surface of the seventh lens 322 may be concave in the paraxial region. The image-side surface of the seventh lens 322 may be convex in the paraxial region. The object-side surface of the seventh lens 322 may be aspherical. The image-side surface of the seventh lens 322 may be aspherical.

The object-side surface of the sixth lens 321 may include an inflection point. The image-side surface of the sixth lens 321 may include an inflection point. The image side-surface of the sixth lens 321 may be convex in the paraxial region and may be concave in the external region of the paraxial region.

The object-side surface of the seventh lens 322 may include an inflection point.

In the third example embodiment, G1_OAL may be 9.82, |1x_f/f3| may be 1.074, |2x_f/f3| may be 2.148, 1xL/2xL may be 0.718, 1xB/2xB may be 0.125, and |G1F/G2F| may be 0.882.

Table 5 lists optical and physical parameters of the optical system 300 in the third example embodiment.

Table 6 lists aspherical data of the optical system 300 in the third example embodiment.

TABLE 5

| optical element | Surface # | Radius | Thickness (Position 1) | Thickness (Position 2) | Index | Abbe # |
|---|---|---|---|---|---|---|
| | Object | Infinity | Infinity | Infinity | | |
| | 1 | Infinity | 0.000 | 0.000 | | |
| 1st lens | 2 | 52.536 | 0.452 | 0.452 | 1.760 | 27.0 |
| | 3 | 47.432 | 2.801 | 2.801 | | |
| 2nd lens | 4 | 27.553 | 1.284 | 1.284 | 1.490 | 68.0 |
| | 5 | 35.260 | 0.684 | 0.684 | | |
| 3rd lens | 6 | −17.367 | 0.274 | 0.274 | 1.760 | 27.0 |
| | 7 | 12.640 | 0.792 | 0.792 | | |
| 4th lens | 8 | 6.968 | 2.000 | 2.000 | 1.535 | 56.1 |
| | 9 | −11.320 | 0.892 | 0.892 | | |
| 5th lens | 10 | −37.888 | 0.642 | 0.642 | 1.535 | 56.1 |
| | 11 | −5.625 | 0.797 | 0.797 | | |
| aperture stop | 12 | Infinity | 5.005 | 1.049 | | |
| 6th lens | 13 | −3.479 | 0.527 | 0.527 | 1.760 | 27.0 |
| | 14 | −3.117 | 1.325 | 1.325 | | |
| 7th lens | 15 | −5.159 | 0.564 | 0.564 | 1.740 | 45.0 |
| | 16 | 400.278 | 0.771 | 12.488 | | |
| filter | 17 | Infinity | 0.210 | 0.210 | 1.518 | 64.2 |
| | 18 | Infinity | 0.712 | 0.712 | | |
| imaging plane | Image | Infinity | −0.012 | −0.012 | | |

TABLE 6

| Surface # | 2 | 3 | 4 | 5 | 6 | 7 | 8 |
|---|---|---|---|---|---|---|---|
| Y radius | 5.2536E+01 | 4.7432E+01 | 2.7553E+01 | 3.5260E+01 | −1.7367E+01 | 1.2640E+01 | 6.9682E+00 |
| conic constant (K) | −6.4787E+01 | 9.0241E+01 | −6.8569E+01 | 4.7207E+01 | 3.6091E+01 | −4.4558E+01 | −6.4674E−01 |
| 4th coefficient (A) | 1.4057E−03 | 1.1591E−03 | −1.1124E−02 | −2.1437E−04 | −2.5875E−02 | 1.7307E−02 | −2.3373E−02 |
| 6th coefficient (B) | 1.3712E−05 | 1.9377E−05 | −1.1044E−03 | −2.0814E−04 | 1.6050E−03 | 1.8230E−03 | −3.9071E−03 |
| 8th coefficient (C) | −9.7629E−07 | −1.0704E−06 | 3.5813E−04 | −6.3886E−06 | −1.2810E−04 | −9.466IE−05 | −5.7933E−04 |
| 10th coefficient (D) | 1.2639E−08 | −1.0160E−07 | 3.2668E−04 | 3.0414E−06 | −1.3370E−05 | −2.2419E−05 | −4.0745E−05 |
| 12th coefficient (E) | 1.0706E−09 | 2.4214E−09 | 1.0406E−04 | 7.5447E−07 | 5.6781E−08 | 4.5470E−06 | −9.2215E−06 |
| 14th coefficient (F) | −2.8166E−10 | 2.1972E−10 | 1.6763E−05 | 1.1734E−07 | −8.1567E−09 | −1.1030E−06 | −1.9252E−05 |
| 16th coefficient (G) | 1.7034E−11 | −9.1953E−12 | 1.1710E−06 | 7.1753E−09 | 2.3477E−08 | −1.0323E−06 | −7.4208E−06 |
| 18th coefficient (H) | −1.7393E−13 | 3.1789E−13 | −1.0274E−12 | −7.8435E−15 | 4.5306E−09 | −1.9832E−07 | −1.2451E−06 |
| 20th coefficient (J) | −4.3191E−15 | −9.5039E−15 | −4.6070E−16 | −2.0468E−16 | 2.9820E−10 | −1.4028E−08 | −8.2572E−08 |

| Surface # | 9 | 10 | 11 | 13 | 14 | 15 | 16 |
|---|---|---|---|---|---|---|---|
| Y radius | −1.1320E+01 | −3.7888E+01 | −5.6250E+00 | −3.4795E+00 | −3.1166E+00 | −5.1587E+00 | −4.0028E+02 |
| conic constant (K) | 1.0261E+01 | 9.6835E+01 | −4.1549E+00 | −1.2153E+00 | −1.3544E+00 | 2.7097E−02 | −5.3981E+01 |
| 4th coefficient (A) | −1.2916E−01 | −9.7220E−02 | 5.1174E−02 | 2.1506E−03 | 1.8533E−03 | 8.7817E−04 | −1.8765E−03 |
| 6th coefficient (B) | −7.5214E−03 | −6.1789E−04 | 1.8921E−02 | 2.0265E−04 | 8.6386E−05 | −1.4800E−04 | 8.9027E−05 |
| 8th coefficient (C) | 8.1877E−05 | 1.0579E−02 | 1.1442E−02 | −3.8931E−06 | 2.2398E−06 | 5.8477E−06 | −1.7050E−06 |
| 10th coefficient (D) | −4.1119E−05 | 3.4955E−03 | 3.8828E−03 | −1.5354E−07 | −4.8688E−09 | 1.8498E−07 | −1.3902E−08 |
| 12th coefficient (E) | −3.3816E−05 | 9.6680E−05 | 4.7838E−05 | −4.3851E−09 | −4.1011E−09 | 1.9008E−11 | 1.6091E−10 |
| 14th coefficient (F) | −3.1793E−06 | −2.4011E−04 | −3.9150E−04 | 7.0588E−11 | −1.3621E−10 | −2.7725E−10 | 9.7873E−12 |
| 16th coefficient (G) | 1.3207E−06 | −7.0204E−05 | −1.2806E−04 | 2.9572E−11 | 6.9070E−12 | −1.5938E−12 | 8.5516E−14 |
| 18th coefficient (H) | 2.5252E−07 | −8.1355E−06 | −1.7885E−05 | −5.0587E−13 | −8.2273E−14 | 2.0445E−13 | 5.5498E−17 |
| 20th coefficient (J) | 1.5082E−08 | −3.3512E−07 | −9.8068E−07 | −2.2337E−14 | −1.9642E−15 | 4.3176E−15 | −8.7817E−17 |

Hereinafter, an optical system 400 will be described according to a fourth example embodiment with reference to FIGS. 4A to 4C.

Figure 4A:
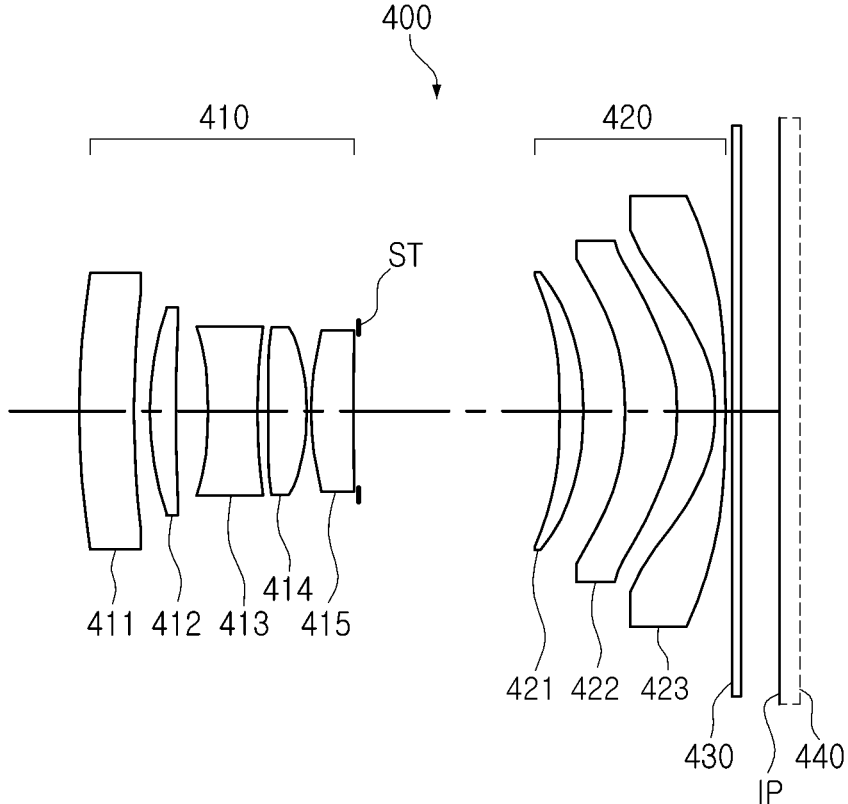
FIG. 4A is a cross-sectional diagram illustrating an optical system in a first position according to a fourth example embodiment of the present disclosure.
Figure 4B:
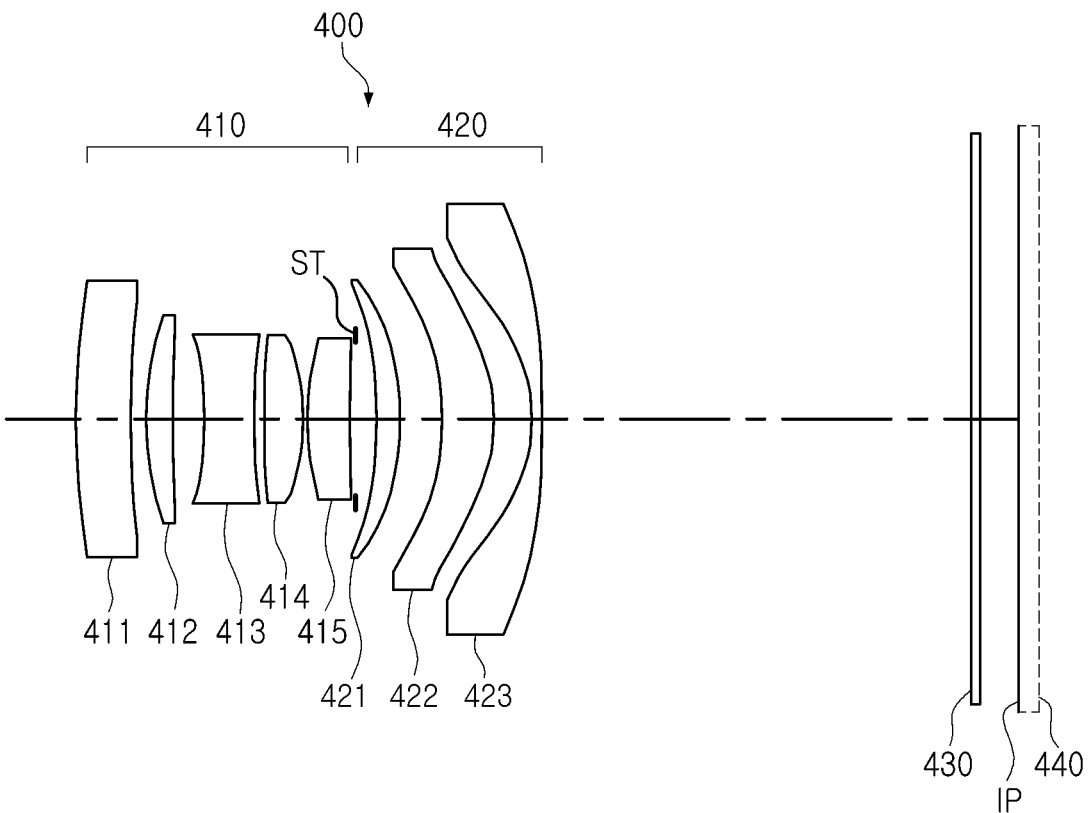
FIG. 4B is a cross-sectional diagram illustrating an optical system in a second position according to a fourth example embodiment of the present disclosure.
Figure 4C:
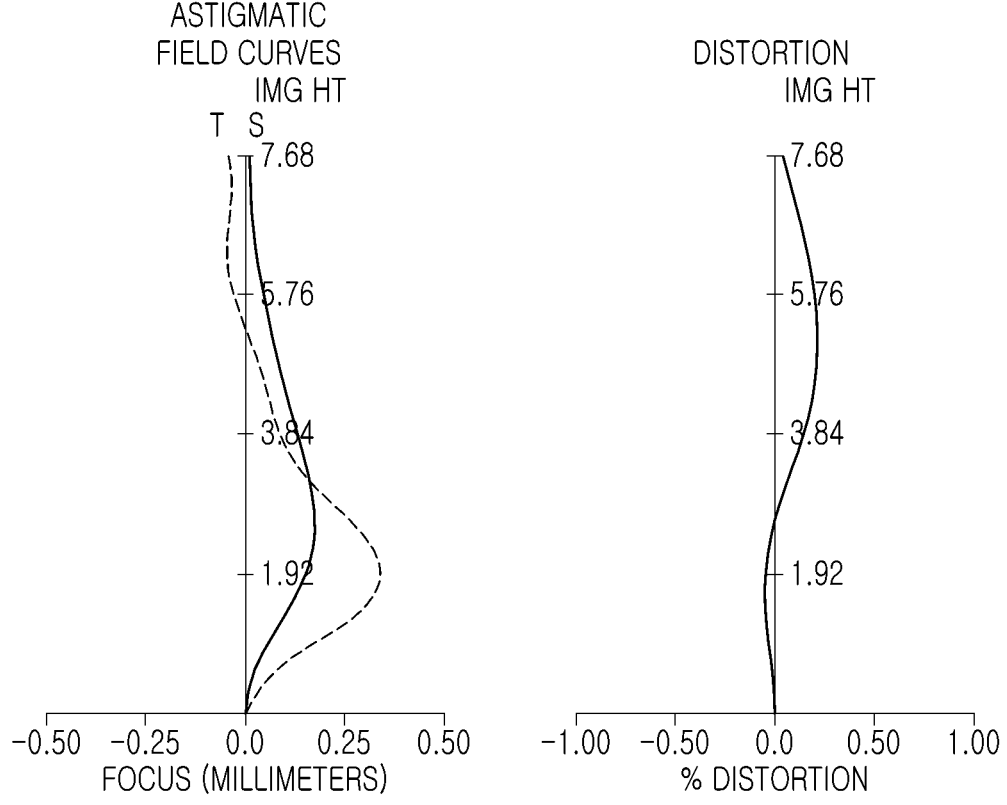
FIG. 4C depicts graphs illustrating aberration properties of an optical system according to a fourth example embodiment of the present disclosure.

FIG. 4A is a cross-sectional diagram illustrating an optical system 400 in a first position according to a fourth example embodiment. FIG. 4B is a cross-sectional diagram illustrating an optical system 400 in a second position according to a fourth example embodiment. FIG. 4C depicts graphs illustrating aberration properties of an optical system 400 according to a fourth example embodiment.

The optical system 400 may include two lens groups, and an image sensor 440. The first lens group 410 may include first to fifth lenses 411, 412, 413, 414, and 415, and the second lens group 420 may include sixth to eighth lenses 421, 422, and 423.

As the first lens group 410 and the second lens group 420 move in the optical axis direction with respect to the image sensor 440, the magnification of the optical system 400 may change. The magnification in the first position may be approximately twice the magnification in the second position.

The focal length may be 12.1 mm in the first position, and may be 21.2 mm in the second position. The F-number may be 2.8 in the first position and may be 4.9 in the second position. A half the length of the diagonal of the imaging plane IP of the image sensor 440 may be 7.0132 mm.

The first lens group 410 may have positive refractive power, and the second lens group 420 may have negative refractive power. The focal length of the first lens group 410 may be 10.77 mm, and the focal length of the second lens group 420 may be −12.41 mm.

The optical system 400 may include an aperture stop ST disposed between the fifth lens 415 and the sixth lens 421. The optical system 400 may include an IR filter 430 disposed between the eighth lens 423 and the image sensor 440. The optical system 400 may include eight lenses having refractive power. Two lenses adjacent to each other among the lenses of the optical system 400 may be spaced apart from each other in the optical axis direction.

The first lens 411 may have positive refractive power. The object-side surface of the first lens 411 may be convex in the paraxial region. The image-side surface of the first lens 411 may be concave in the paraxial region. The object-side surface of the first lens 411 may be aspherical. The image-side surface of the first lens 411 may be aspherical.

The second lens 412 may have positive refractive power. The object-side surface of the second lens 412 may be convex in the paraxial region. The image-side surface of the second lens 412 may be concave in the paraxial region. The object-side surface of the second lens 412 may be aspherical. The image-side surface of the second lens 412 may be aspherical.

The third lens 413 may have negative refractive power. The object-side surface of the third lens 413 may be concave in the paraxial region. The image-side surface of the third lens 413 may be concave in the paraxial region. The object-side surface of the third lens 413 may be aspherical. The image-side surface of the third lens 413 may be aspherical.

The fourth lens 414 may have positive refractive power. The object-side surface of the fourth lens 414 may be convex in the paraxial region. The image-side surface of the fourth lens 414 may be convex in the paraxial region. The object-side surface of the fourth lens 414 may be aspherical. The image-side surface of the fourth lens 414 may be aspherical.

The fifth lens 415 may have positive refractive power. The object-side surface of the fifth lens 415 may be convex in the paraxial region. The image-side surface of the fifth lens 415 may be concave in the paraxial region. The object-side surface of the fifth lens 415 may be aspherical. The image-side surface of the fifth lens 415 may be aspherical.

The sixth lens 421 may have positive refractive power. The object-side surface of the sixth lens 421 may be concave in the paraxial region. The image-side surface of the sixth lens 421 may be convex in the paraxial region. The object-side surface of the sixth lens 421 may be aspherical. The image-side surface of the sixth lens 421 may be aspherical.

The seventh lens 422 may have positive refractive power. The object-side surface of the seventh lens 422 may be concave in the paraxial region. The image-side surface of the seventh lens 422 may be convex in the paraxial region. The object-side surface of the seventh lens 422 may be aspherical. The image-side surface of the seventh lens 422 may be aspherical.

The eighth lens 423 may have negative refractive power. The object-side surface of the eighth lens 423 may be concave in the paraxial region. The image-side surface of the eighth lens 423 may be convex in the paraxial region. The object-side surface of the eighth lens 423 may be aspherical. The image-side surface of the eighth lens 423 may be aspherical.

The image-side surface of the seventh lens 422 may include an inflection point.

The object-side surface of the eighth lens 423 may include an inflection point.

In the fourth example embodiment, G1_OAL may be 7.068, |1x_f/f3| may be 1.892, |2x_f/f3| may be 3.311, 1xL/2xL may be 0.744, 1xB/2xB may be 0.107, and |G1F/G2F| may be 0.868.

Table 7 lists optical and physical parameters of the optical system 400 in the fourth example embodiment. Table 8 lists aspherical data of the optical system 400 in the fourth example embodiment.

TABLE 7

| optical element | Surface # | Radius | Thickness (Position 1) | Thickness (Position 2) | Index | Abbe # |
|---|---|---|---|---|---|---|
| | Object | Infinity | Infinity | Infinity | | |
| | 1 | Infinity | 0.000 | 0.000 | | |
| 1st lens | 2 | 22.564 | 1.406 | 1.406 | 1.740 | 45.0 |
| | 3 | 28.329 | 0.402 | 0.402 | | |
| 2nd lens | 4 | 8.218 | 0.700 | 0.700 | 1.490 | 68.0 |
| | 5 | 2206.199 | 0.821 | 0.821 | | |
| 3rd lens | 6 | −7.553 | 1.238 | 1.238 | 1.740 | 45.0 |
| | 7 | 14.052 | 0.287 | 0.287 | | |
| 4th lens | 8 | 160.520 | 1.008 | 1.008 | 1.535 | 56.1 |
| | 9 | −5.932 | 0.100 | 0.100 | | |
| 5th lens | 10 | 7.030 | 1.105 | 1.105 | 1.535 | 56.1 |
| | 11 | 873.808 | 0.114 | 0.114 | | |
| aperture stop | 12 | Infinity | 5.276 | 0.547 | | |
| 6th lens | 13 | −11.138 | 0.600 | 0.600 | 1.490 | 68.0 |
| | 14 | −7.495 | 1.100 | 1.100 | | |
| 7th lens | 15 | −5.811 | 1.307 | 1.307 | 1.760 | 27.0 |
| | 16 | −4.745 | 0.991 | 0.991 | | |
| 8$^{th}$ lens | 17 | −4.376 | 0.260 | 0.260 | 1.740 | 45.0 |
| | 18 | −28.181 | 0.100 | 11.032 | | |
| filter | 19 | Infinity | 0.210 | 0.210 | 1.518 | 64.2 |
| | 20 | Infinity | 1.000 | 1.000 | | |
| imaging plane | Image | Infinity | 0.000 | 0.000 | | |

TABLE 8

| Surface # | 2 | 3 | 4 | 5 | 6 | 7 | 8 | 9 |
|---|---|---|---|---|---|---|---|---|
| Y radius | 2.2564E+01 | 2.8329E+01 | 8.2184E+00 | 2.2062E+03 | −7.5528E+00 | 1.4052E+01 | 1.6052E+02 | −5.9320E+00 |
| conic constant (K) | −9.1105E−02 | −1.4984E−01 | −2.4699E−01 | −2.4325E+05 | −2.2466E−02 | −3.5136E+00 | 4.1850E+03 | 1.1253E+00 |
| 4th coefficient (A) | −8.9933E−03 | 6.5587E−03 | −6.3771E−02 | 4.9748E−02 | −2.5875E−02 | −2.6417E−03 | 7.2046E−02 | −3.8321E−02 |
| 6th coefficient (B) | −5.7322E−03 | −4.4851E−04 | 1.1971E−03 | −2.3008E−02 | −3.0033E−02 | 8.2773E−03 | −3.2274E−04 | −1.2807E−02 |
| 8th coefficient (C) | −1.8635E−04 | 9.5338E−04 | −1.1492E−02 | −2.6172E−03 | 5.3792E−03 | 3.5681E−04 | −6.6933E−03 | 9.5140E−05 |
| 10th coefficient (D) | 3.8940E−04 | 1.2857E−03 | −2.4542E−03 | −2.0052E−03 | −7.9403E−04 | 1.1570E−03 | 3.2062E−03 | 1.4352E−03 |
| 12th coefficient (E) | −3.2699E−06 | −1.0914E−03 | −9.4022E−04 | −1.1567E−03 | −1.1716E−04 | −1.0965E−03 | −1.5479E−03 | −1.1208E−03 |
| 14th coefficient (F) | 1.1913E−04 | 1.2118E−04 | 1.9286E−03 | 4.3613E−04 | −1.2676E−04 | 1.9980E−04 | 4.9330E−04 | 3.9543E−04 |
| 16th coefficient (G) | −2.2467E−05 | −1.1300E−04 | −9.0740E−04 | −5.6416E−04 | −2.9750E−04 | −3.1803E−04 | 4.4486E−05 | −8.6449E−05 |
| 18th coefficient (H) | −4.4884E−05 | 3.7799E−04 | −4.3214E−04 | −6.0319E−05 | 1.7765E−05 | −5.99 32E−05 | 3.7063E−05 | 1.8103E−04 |
| 20th coefficient (J) | 2.6703E−05 | 2.3570E−04 | −1.9556E−04 | 2.4599E−04 | −6.6260E−05 | 3.2366E−05 | −1.2253E−04 | −1.1103E−05 |
| 22nd coefficient (L) | −2.8048E−07 | −1.0411E−04 | −1.9454E−05 | 2.5069E−04 | −1.9949E−05 | 1.7695E−04 | 2.8838E−05 | 1.1939E−04 |
| 24th coefficient (M) | −7.9550E−07 | −3.2310E−05 | 3.6374E−04 | 3.1794E−04 | 2.7089E−05 | 1.0483E−04 | 9.9433E−05 | 8.5428E−05 |
| 26th coefficient (N) | −1.3761E−06 | −1.0190E−04 | 1.4321E−04 | 1.7496E−04 | 5.9415E−05 | 1.0662E−05 | 8.6860E−05 | 7.9360E−05 |
| 28th coefficient (O) | 2.9542E−07 | −7.0967E−05 | 3.2956E−06 | 7.0164E−05 | 4.9036E−05 | −1.9433E−05 | 4.7688E−05 | 3.5642E−05 |
| 30th coefficient (P) | 3.9913E−08 | −2.9878E−05 | 1.9974E−06 | 1.5131E−05 | 1.3210E−05 | −1.2294E−05 | 1.4235E−05 | 9.7840E−06 |

| Surface # | 10 | 11 | 13 | 14 | 15 | 16 | 17 | 18 |
|---|---|---|---|---|---|---|---|---|
| Y radius | 7.0299E+00 | 8.7381E+02 | −1.1138E+01 | −7.4954E+00 | −5.8114E+00 | −4.7447E+00 | −4.3760E+00 | −2.8181E+01 |
| conic constant (K) | −2.5604E+00 | 0.0000E+00 | 0.0000E+00 | 0.0000E+00 | 3.3826E−01 | −7.7883E−01 | −1.2126E+00 | 2.1389E+01 |
| 4th coefficient (A) | −2.7773E−02 | 7.5397E−03 | −1.0617E−01 | −1.6844E−01 | 8.2706E−01 | 9.0385E−01 | 1.3807E−01 | −6.7043E−02 |
| 6th coefficient (B) | −7.3822E−03 | −6.3847E−03 | 1.4771E−02 | −2.3098E−02 | 1.0068E−01 | 1.7263E−01 | 2.9089E−01 | 2.4777E−01 |
| 8th coefficient (C) | 2.6149E−04 | −4.0344E−04 | 7.9919E−03 | 2.9059E−02 | 3.1425E−02 | −1.5231E−02 | −7.4643E−02 | −9.6008E−02 |
| 10th coefficient (D) | 6.3224E−04 | −7.1570E−04 | −1.6110E−02 | −1.9498E−02 | −6.8137E−03 | −4.646IE−04 | −8.7534E−05 | 3.1676E−03 |
| 12th coefficient (E) | −2.3559E−04 | −9.0437E−04 | 9.5343E−03 | 1.5798E−03 | −1.6167E−03 | −1.3260E−02 | −9.2632E−03 | 5.2215E−03 |
| 14th coefficient (F) | 1.2338E−04 | −4.6879E−04 | −1.5408E−03 | 5.0563E−03 | −2.4585E−03 | −1.2920E−02 | 5.5548E−03 | −3.4422E−03 |
| 16th coefficient (G) | −6.1719E−05 | −1.4426E−04 | −2.3069E−03 | −2.4440E−03 | −5.9212E−04 | 2.6375E−03 | −2.4437E−03 | 2.8777E−03 |
| 18th coefficient (H) | 2.5978E−05 | 9.9657E−05 | 2.8814E−03 | −1.3495E−03 | −2.4308E−03 | 9.5521E−04 | 7.3495E−04 | 1.1552E−02 |
| 20th coefficient (J) | −8.4721E−06 | 1.8327E−04 | −9.4710E−04 | 2.5420E−03 | 1.0441E−04 | 4.9748E−05 | 2.8236E−03 | −1.8346E−02 |

TABLE 8-continued

| 22th coefficient (L) | 1.0049E−06 | 1.8606E−04 | −1.3852E−03 | 2.0114E−03 | −3.2732E−04 | −4.6072E−04 | −3.9830E−03 | 7.8924E−03 |
| 24th coefficient (M) | 1.4760E−06 | 1.3491E−04 | 1.1713E−03 | −4.9680E−04 | −3.7823E−04 | 7.402IE−05 | 1.1811E−03 | 4.9208E−03 |
| 26th coefficient (N) | −1.6578E−06 | 8.5876E−05 | −9.8314E−05 | −2.7105E−04 | 8.2037E−04 | 1.4833E−03 | 2.1989E−03 | −1.0380E−03 |
| 28th coefficient (O) | 8.9588E−07 | 4.4413E−05 | −2.0051E−03 | 2.7633E−04 | −3.7696E−04 | 1.2651E−04 | −1.0316E−03 | −3.8813E−03 |
| 30th coefficient (P) | −1.8320E−07 | 1.6952E−05 | −9.6186E−04 | 1.1905E−04 | −4.6120E−04 | −3.4536E−04 | −8.9412E−04 | −7.6448E−03 |

Hereinafter, an optical system 500 will be described according to a fifth example embodiment with reference to FIGS. 5A to 5C.

Figure 5A:
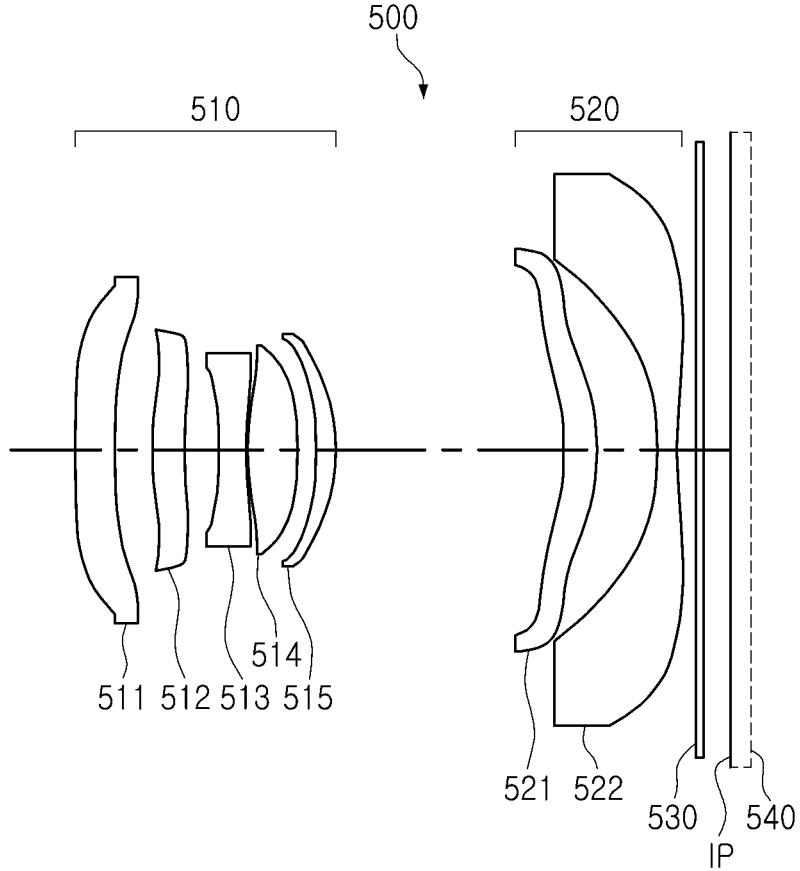
FIG. 5A is a cross-sectional diagram illustrating an optical system in a first position according to a fifth example embodiment of the present disclosure.
Figure 5B:
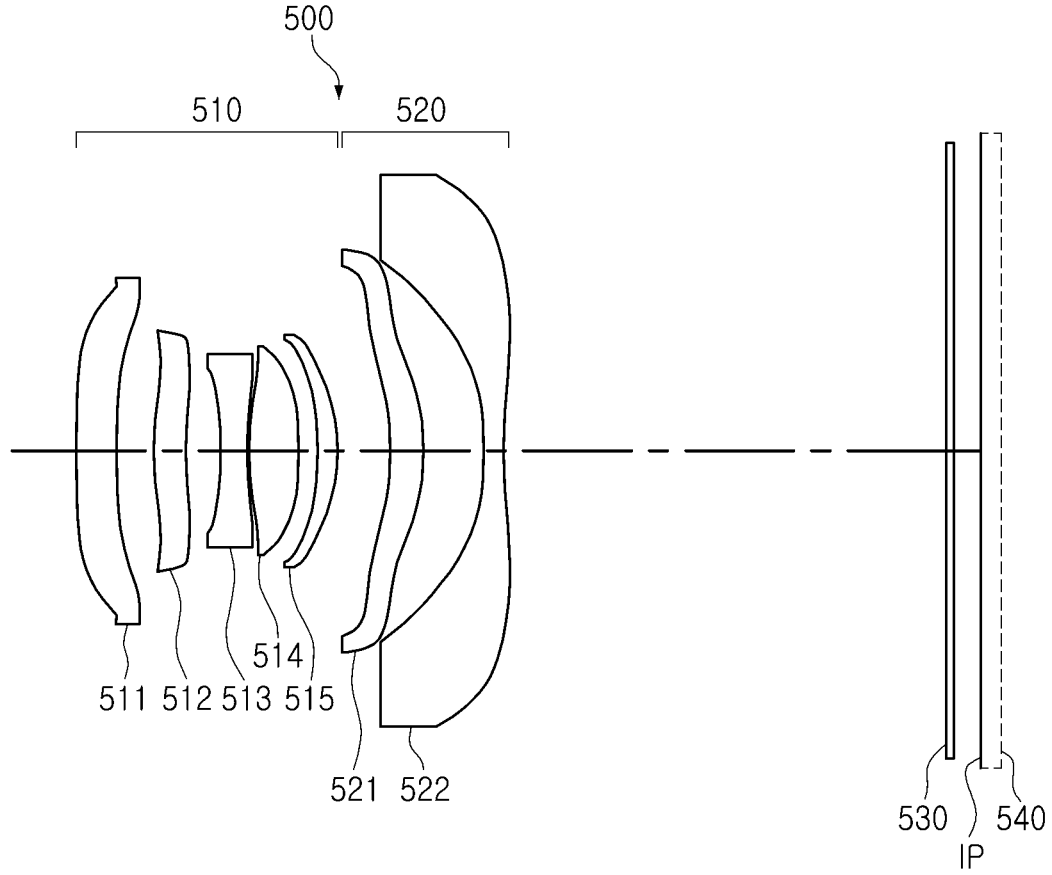
FIG. 5B is a cross-sectional diagram illustrating an optical system in a second position according to a fifth example embodiment of the present disclosure.
Figure 5C:
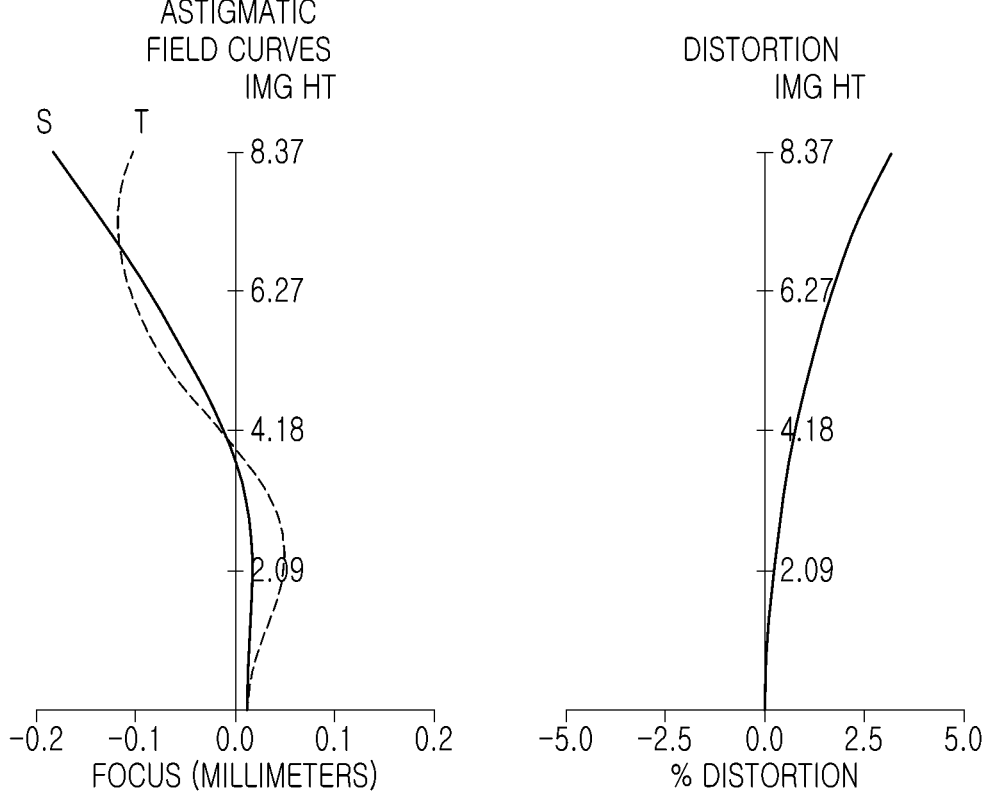
FIG. 5C depicts graphs illustrating aberration properties of an optical system according to a fifth example embodiment of the present disclosure.

FIG. 5A is a cross-sectional diagram illustrating an optical system 500 in a first position according to a fifth example embodiment. FIG. 5B is a cross-sectional diagram illustrating an optical system 500 in a second position according to a fifth example embodiment. FIG. 5C depicts graphs illustrating aberration properties of an optical system 500 according to a fifth example embodiment.

The optical system 500 may include two lens groups, and an image sensor 540. The first lens group 510 may include first to fifth lenses 511, 512, 513, 514, and 515, and the second lens group 520 may include a sixth lens 521 and a seventh lens 522.

As the first lens group 510 and the second lens group 520 move in the optical axis direction with respect to the image sensor 540, the magnification of the optical system 500 may change. The magnification in the first position may be approximately twice the magnification in the second position.

The focal length may be 10.8 mm in the first position, and may be 20.9 mm in the second position. The F-number may be 2.4 in the first position and may be 4.7 in the second position. A half the length of the diagonal of the imaging plane IP of the image sensor 540 may be 8.166 mm.

The first lens group 510 may have positive refractive power, and the second lens group 520 may have negative refractive power. The focal length of the first lens group 510 may be 9.43 mm, and the focal length of the second lens group 520 may be −10.28 mm.

The optical system 500 may include an aperture stop disposed between the fifth lens 515 and the sixth lens 521. The optical system 500 may include an IR filter 530 disposed between the seventh lens 522 and the image sensor 540. The optical system 500 may include seven lenses having refractive power. Two lenses adjacent to each other among the lenses of the optical system 500 may be spaced apart from each other in the optical axis direction.

The first lens 511 may have negative refractive power. The object-side surface of the first lens 511 may be convex in the paraxial region. The image-side surface of the first lens 511 may be concave in the paraxial region. The object-side surface of the first lens 511 may be aspherical. The image-side surface of the first lens 511 may be aspherical.

The second lens 512 may have positive refractive power. The object-side surface of the second lens 512 may be convex in the paraxial region. The image-side surface of the second lens 512 may be concave in the paraxial region. The object-side surface of the second lens 512 may be aspherical. The image-side surface of the second lens 512 may be aspherical.

The third lens 513 may have negative refractive power. The object-side surface of the third lens 513 may be concave in the paraxial region. The image-side surface of the third lens 513 may be concave in the paraxial region. The object-side surface of the third lens 513 may be aspherical. The image-side surface of the third lens 513 may be aspherical.

The fourth lens 514 may have positive refractive power. The object-side surface of the fourth lens 514 may be convex in the paraxial region. The image-side surface of the fourth lens 514 may be convex in the paraxial region. The object-side surface of the fourth lens 514 may be aspherical. The image-side surface of the fourth lens 514 may be aspherical.

The fifth lens 515 may have positive refractive power. The object-side surface of the fifth lens 515 may be concave in the paraxial region. The image-side surface of the fifth lens 515 may be convex in the paraxial region. The object-side surface of the fifth lens 515 may be aspherical. The image-side surface of the fifth lens 515 may be aspherical.

The sixth lens 521 may have positive refractive power. The object-side surface of the sixth lens 521 may be concave in the paraxial region. The image-side surface of the sixth lens 521 may be convex in the paraxial region. The object-side surface of the sixth lens 521 may be aspherical. The image-side surface of the sixth lens 521 may be aspherical.

The seventh lens 522 may have negative refractive power. The object-side surface of the seventh lens 522 may be concave in the paraxial region. The image-side surface of the seventh lens 522 may be concave in the paraxial region. The object-side surface of the seventh lens 522 may be aspherical. The image-side surface of the seventh lens 522 may be aspherical.

The image-side surface of the first lens 511 may include an inflection point.

The object-side surface of the second lens 512 may include an inflection point. The object-side surface of the second lens 512 may be convex in the paraxial region and may be concave in the external region of the paraxial region. The image-side surface of the second lens 512 may include an inflection point. The image-side surface of the second lens 512 may be concave in the paraxial region and may be convex in the external region of the paraxial region.

The image-side surface of the third lens 513 may include an inflection point. The image-side surface of the third lens 513 may be concave in the paraxial region and may be convex in the external region of the paraxial region.

The object-side surface of the sixth lens 521 may include an inflection point. The image-side surface of the sixth lens 521 may include an inflection point.

The image-side surface of the seventh lens 522 may include an inflection point. The image-side surface of the seventh lens 522 may be concave in the paraxial region and may be convex in the external region of the paraxial region.

In the fifth example embodiment, G1_OAL may be 6.786, |1x_f/f3| may be 1.221, |2x_f/f3| may be 2.369, 1xL/2xL may be 0.717, 1xB/2xB may be 0.113, and |G1F/G2F| may be 0.917.

Table 9 lists optical and physical parameters of the optical system 500 in the fifth example embodiment. Table 10 lists aspherical data of the optical system 500 in the fifth example embodiment.

TABLE 9

| optical element | Surface # | Radius | Thickness (Position 1) | Thickness (Position 2) | Index | Abbe # |
|---|---|---|---|---|---|---|
| | Object | Infinity | Infinity | Infinity | | |
| | 1 | Infinity | 0.000 | 0.000 | | |
| 1st lens | 2 | 72.886 | 1.029 | 1.029 | 1.535 | 56.1 |
| | 3 | 40.549 | 0.979 | 0.979 | | |
| 2nd lens | 4 | 11.246 | 0.843 | 0.843 | 1.680 | 18.4 |
| | 5 | 16.245 | 0.890 | 0.890 | | |
| 3rd lens | 6 | −14.229 | 0.702 | 0.702 | 1.637 | 23.4 |
| | 7 | 9.652 | 0.030 | 0.030 | | |
| 4th lens | 8 | 6.612 | 1.299 | 1.299 | 1.535 | 56.1 |
| | 9 | −10.068 | 0.497 | 0.497 | | |
| 5th lens | 10 | −9.736 | 0.518 | 0.518 | 1.535 | 56.1 |
| | 11 | 4.293 | 0.800 | 0.800 | | |
| aperture stop | 12 | Infinity | 4.957 | 0.592 | | |
| 6th lens | 13 | −5.971 | 0.857 | 0.857 | 1.680 | 18.4 |
| | 14 | −4.744 | 1.564 | 1.564 | | |
| 7th lens | 15 | −8.609 | 0.500 | 0.500 | 1.637 | 23.4 |
| | 16 | 10.546 | 0.500 | 11.523 | | |
| filter | 17 | Infinity | 0.210 | 0.210 | 1.518 | 64.2 |
| | 18 | Infinity | 0.712 | 0.712 | | |
| imaging plane | Image | Infinity | −0.012 | −0.012 | | |

TABLE 10

| Surface # | 2 | 3 | 4 | 5 | 6 | 7 | 8 |
|---|---|---|---|---|---|---|---|
| Y radius | 7.2886E+01 | 4.0549E+01 | 1.1246E+01 | 1.6245E+01 | −1.4229E+01 | 9.6516E+00 | 6.6116E+00 |
| conic constant (K) | −6.9762E−01 | 9.9000E+01 | −3.4225E+01 | −5.0566E+01 | 3.5310E+01 | −7.2587E+01 | −1.1072E+01 |
| 4th coefficient (A) | 8.0087E−01 | 3.8404E−01 | −1.1577E−02 | −1.6381E−02 | −4.2592E−02 | −2.2086E−02 | −5.2459E−02 |
| 6th coefficient (B) | 4.4074E−02 | −6.8714E−02 | −2.9233E−02 | −7.7704E−03 | −2.4765E−04 | −3.0265E−03 | −4.5843E−04 |
| 8th coefficient (C) | 5.6478E−03 | −9.8784E−03 | 5.8635E−04 | −2.1213E−04 | −4.2376E−04 | 7.3781E−05 | −9.0944E−04 |
| 10th coefficient (D) | −1.9451E−03 | −1.0888E−03 | 6.9634E−04 | 1.9845E−04 | 1.0879E−04 | −8.5359E−05 | 9.0919E−05 |
| 12th coefficient (E) | −3.1189E−03 | −5.1631E−04 | 1.1518E−04 | 2.0417E−05 | −1.4865E−05 | 4.9511E−05 | 3.1844E−05 |
| 14th coefficient (F) | −9.7042E−04 | 4.4451E−04 | −3.7290E−05 | −3.1963E−06 | 9.4247E−06 | −1.2345E−05 | −5.4241E−06 |
| 16th coefficient (G) | −4.1843E−04 | 1.4615E−04 | 6.5348E−06 | −2.7576E−06 | −2.6938E−06 | 2.6632E−06 | 4.4376E−06 |
| 18th coefficient (H) | −1.5459E−04 | −6.8365E−05 | −1.9439E−06 | 8.8526E−07 | 5.5144E−08 | −5.2435E−07 | −1.1634E−06 |
| 20th coefficient (J) | −1.0463E−05 | −2.2335E−05 | 1.5849E−07 | −8.3805E−08 | 6.9435E−08 | 2.9136E−08 | 4.0909E−08 |

| Surface # | 9 | 10 | 11 | 13 | 14 | 15 | 16 |
|---|---|---|---|---|---|---|---|
| Y radius | −1.0068E+01 | −9.7359E+00 | −4.2933E+00 | −5.9709E+00 | −4.7441E+00 | −8.6091E+00 | 1.0546E+01 |
| conic constant (K) | 1.0323E+01 | 6.6435E+00 | −1.9915E+00 | −8.0418E−02 | −1.2461E+00 | 1.5218E+00 | −3.4555E+00 |
| 4th coefficient (A) | −1.5607E−01 | −1.3030E−01 | −1.3425E−02 | 1.5271E+00 | 1.5497E+00 | −8.4290E−01 | −2.9608E+00 |
| 6th coefficient (B) | −1.1167E−02 | −1.5177E−03 | 8.2843E−03 | −1.4696E−01 | −1.9920E−01 | 2.9598E−01 | 3.5172E−01 |
| 8th coefficient (C) | 2.9914E−03 | 1.4670E−02 | 5.8222E−03 | −6.2744E−02 | −7.0261E−02 | −1.6745E−02 | −1.7134E−01 |
| 10th coefficient (D) | −1.0885E−04 | −1.2146E−03 | −4.8031E−03 | −1.1402E−02 | −6.4093E−03 | −1.8825E−02 | 4.2177E−02 |
| 12th coefficient (E) | −4.6213E−05 | −1.6881E−03 | −2.6412E−03 | 4.2326E−03 | 1.7440E−02 | 8.3651E−03 | −1.5780E−02 |
| 14th coefficient (F) | 1.0206E−05 | −6.0396E−05 | 2.2286E−04 | −6.2221E−03 | −1.3823E−02 | −9.7180E−05 | 1.1340E−02 |
| 16th coefficient (G) | −4.6457E−06 | 8.7663E−05 | 2.2712E−04 | −3.0597E−03 | −8.9005E−03 | −1.7524E−02 | −5.2748E−03 |
| 18th coefficient (H) | 3.2413E−06 | 2.5221E−05 | −8.3249E−06 | −5.4639E−04 | −1.4801E−03 | −1.8180E−03 | −6.9838E−03 |
| 20th coefficient (J) | −5.1912E−07 | −1.5170E−05 | −3.5043E−05 | −7.6514E−04 | −7.3640E−04 | −5.6815E−03 | 3.6034E−03 |

Hereinafter, an optical system 600 will be described according to a sixth example embodiment with reference to FIGS. 6A to 6C.

Figure 6A:
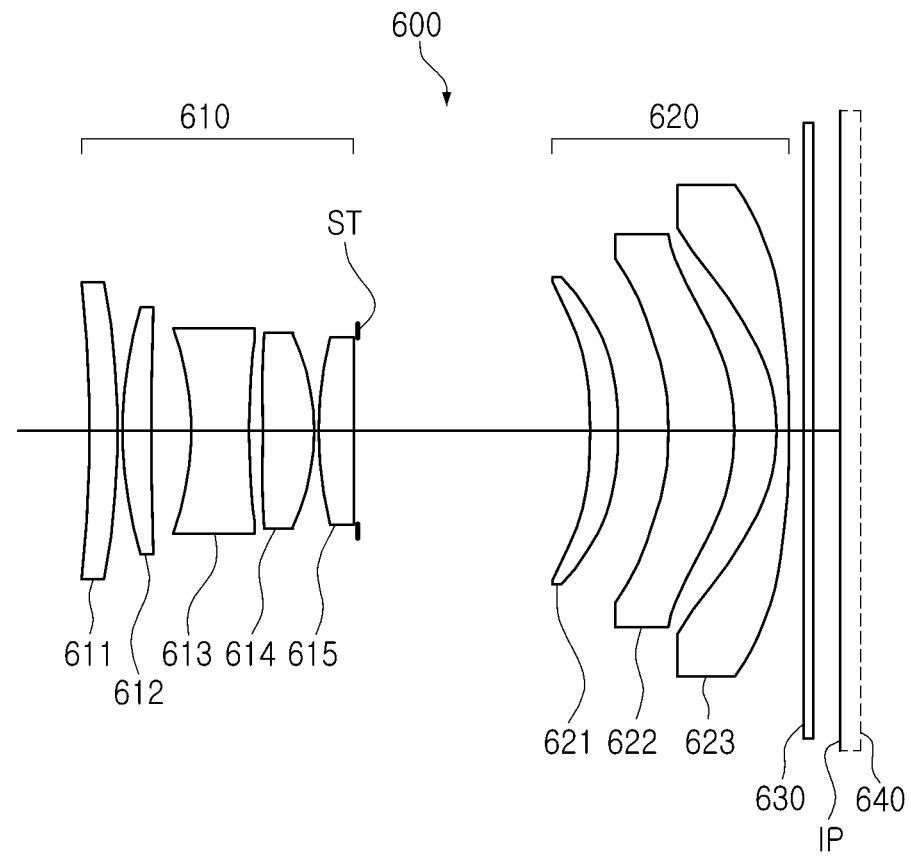
FIG. 6A is a cross-sectional diagram illustrating an optical system in a first position according to a sixth example embodiment of the present disclosure.
Figure 6B:
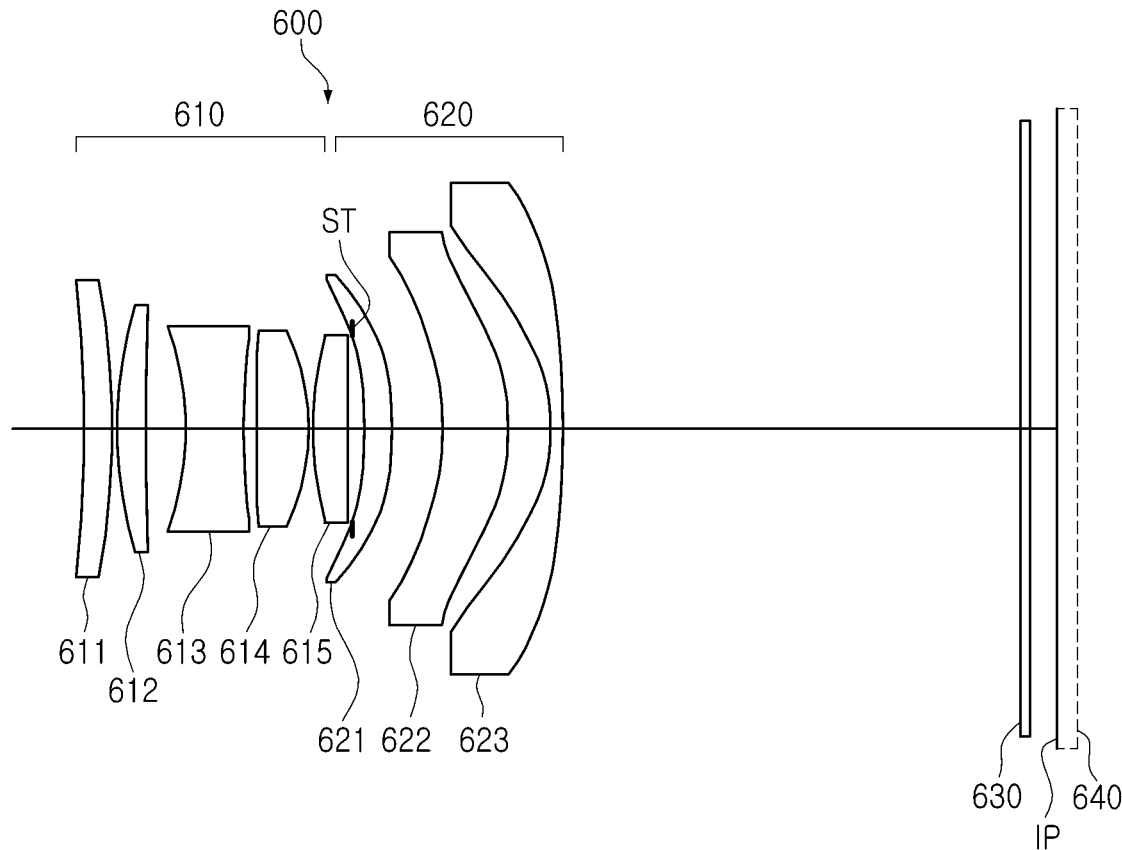
FIG. 6B is a cross-sectional diagram illustrating an optical system in a second position according to a sixth example embodiment of the present disclosure.
Figure 6C:
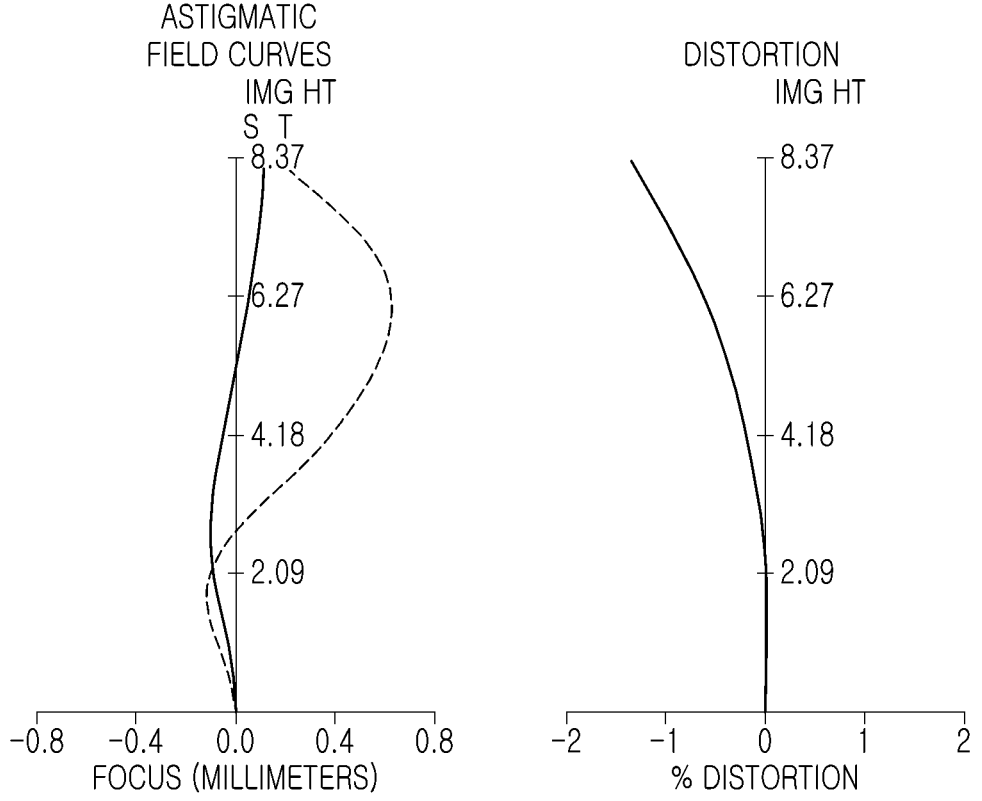
FIG. 6C depicts graphs illustrating aberration properties of an optical system according to a sixth example embodiment of the present disclosure.

FIG. 6A is a cross-sectional diagram illustrating an optical system in a first position according to a sixth example embodiment. FIG. 6B is a cross-sectional diagram illustrating an optical system in a second position according to a sixth example embodiment. FIG. 6C depicts graphs illustrating aberration properties of an optical system according to a sixth example embodiment.

The optical system 600 may include two lens groups, and an image sensor 640. The first lens group 610 may include first to fifth lenses 611, 612, 613, 614, and 615, and the second lens group 620 may include sixth to eighth lenses 621, 622, and 623.

As the first lens group 610 and the second lens group 620 move in the optical axis direction with respect to the image sensor 640, the magnification of the optical system 600 may change. The magnification in the first position may be approximately twice the magnification in the second position.

The focal length may be 13.1 mm in the first position, and may be 22.9 mm in the second position. The F-number may be 2.7 in the first position and may be 4.7 in the second position. A half the length of the diagonal of the imaging plane IP of the image sensor 640 may be 7.0132 mm.

The first lens group 610 may have positive refractive power, and the second lens group 620 may have negative refractive power. The focal length of the first lens group 610 may be 11.62 mm, and the focal length of the second lens group 620 may be −15.13 mm.

The optical system 600 may include an aperture stop ST disposed between the fifth lens 615 and the sixth lens 621. The optical system 600 may include an IR filter 630 disposed between the eighth lens 623 and the image sensor 640. The optical system 600 may include eight lenses having refractive power. Two lenses adjacent to each other among the lenses of the optical system 600 may be spaced apart from each other in the optical axis direction.

The first lens 611 may have positive refractive power. The object-side surface of the first lens 611 may be concave in the paraxial region. The image-side surface of the first lens 611 may be convex in the paraxial region. The object-side surface of the first lens 611 may be aspherical. The image-side surface of the first lens 611 may be aspherical.

The second lens 612 may have positive refractive power. The object-side surface of the second lens 612 may be convex in the paraxial region. The image-side surface of the second lens 612 may be concave in the paraxial region. The object-side surface of the second lens 612 may be aspherical. The image-side surface of the second lens 612 may be aspherical.

The third lens 613 may have negative refractive power. The object-side surface of the third lens 613 may be concave in the paraxial region. The image-side surface of the third lens 613 may be concave in the paraxial region. The object-side surface of the third lens 613 may be aspherical. The image-side surface of the third lens 613 may be aspherical.

The fourth lens 614 may have positive refractive power. The object-side surface of the fourth lens 614 may be concave in the paraxial region. The image-side surface of the fourth lens 614 may be convex in the paraxial region. The object-side surface of the fourth lens 614 may be aspherical. The image-side surface of the fourth lens 614 may be aspherical.

The fifth lens 615 may have positive refractive power. The object-side surface of the fifth lens 615 may be convex in the paraxial region. The image-side surface of the fifth lens 615 may be convex in the paraxial region. The object-side surface of the fifth lens 615 may be aspherical. The image-side surface of the fifth lens 615 may be aspherical.

The sixth lens 621 may have positive refractive power. The object-side surface of the sixth lens 621 may be concave in the paraxial region. The image-side surface of the sixth lens 621 may be convex in the paraxial region. The object-side surface of the sixth lens 621 may be aspherical. The image-side surface of the sixth lens 621 may be aspherical.

The seventh lens 622 may have positive refractive power. The object-side surface of the seventh lens 622 may be concave in the paraxial region. The image-side surface of the seventh lens 622 may be convex in the paraxial region. The object-side surface of the seventh lens 622 may be aspherical. The image-side surface of the seventh lens 622 may be aspherical.

The eighth lens 623 may have negative refractive power. The object-side surface of the eighth lens 623 may be concave in the paraxial region. The image-side surface of the eighth lens 623 may be convex in the paraxial region. The object-side surface of the eighth lens 623 may be aspherical. The image-side surface of the eighth lens 623 may be aspherical.

The object-side surface of the fourth lens 614 may include an inflection point. The object-side surface of the fourth lens 614 may be concave in the paraxial region and may be convex in the external region of the paraxial region.

The image-side surface of the seventh lens 622 may include an inflection point.

The object-side surface of the eighth lens 623 may include an inflection point.

In the sixth example embodiment, G1_OAL may be 6.862, $|1x\_f/f3|$ may be 1.741, $|2x\_f/f3|$ may be 3.046, 1xL/2xL may be 0.74, 1xB/2xB may be 0.103, and $|G1F/G2F|$ may be 0.768.

Table 11 lists optical and physical parameters of the optical system 600 in the sixth example embodiment. Table 12 lists aspherical data of the optical system 600 in the sixth example embodiment.

TABLE 11

| optical element | Surface # | Radius | Thickness (Position 1) | Thickness (Position 2) | Index | Abbe # |
|---|---|---|---|---|---|---|
| | Object | Infinity | Infinity | Infinity | | |
| | 1 | Infinity | 0.000 | 0.000 | | |
| 1st lens | 2 | −37.435 | 0.732 | 0.732 | 1.740 | 45.0 |
| | 3 | −21.837 | 0.131 | 0.131 | | |
| 2nd lens | 4 | 10.729 | 0.750 | 0.750 | 1.490 | 68.0 |
| | 5 | 6396.645 | 0.998 | 0.998 | | |
| 3rd lens | 6 | −8.281 | 1.525 | 1.525 | 1.740 | 45.0 |
| | 7 | 19.010 | 0.354 | 0.354 | | |
| 4th lens | 8 | −249.065 | 1.353 | 1.353 | 1.535 | 56.1 |
| | 9 | −6.625 | 0.100 | 0.100 | | |
| 5th lens | 10 | 8.591 | 0.920 | 0.920 | 1.535 | 56.1 |
| | 11 | −871.330 | 0.100 | 0.100 | | |
| aperture stop | 12 | Infinity | 6.061 | 0.312 | | |
| 6th lens | 13 | −8.856 | 0.716 | 0.716 | 1.535 | 56.1 |
| | 14 | −6.799 | 1.312 | 1.312 | | |
| 7th lens | 15 | −7.018 | 1.715 | 1.715 | 1.760 | 27.0 |
| | 16 | −5.539 | 1.088 | 1.088 | | |
| $8^{th}$ lens | 17 | −5.115 | 0.320 | 0.320 | 1.740 | 45.0 |
| | 18 | −32.961 | 0.500 | 13.160 | | |
| filter | 19 | Infinity | 0.251 | 0.251 | 1.518 | 64.2 |
| | 20 | Infinity | 0.700 | 0.700 | | |
| imaging plane | Image | Infinity | 0.000 | 0.000 | | |

TABLE 12

| Surface # | 2 | 3 | 4 | 5 | 6 | 7 | 8 | 9 |
|---|---|---|---|---|---|---|---|---|
| Y radius | −3.7435E+01 | −2.1837E+01 | 1.0729E+01 | 6.3966E+03 | −8.2815E+00 | 1.9010E+01 | −2.4906E+02 | −6.6248E+00 |
| conic constant (K) | −1.4071E+00 | −7.9962E+00 | −2.9996E−01 | 0.0000E+00 | 2.8861E−02 | −3.7499E+00 | 0.0000E+00 | 1.1174E+00 |
| 4th coefficient (A) | −5.1199E−03 | 4.7359E−03 | −7.7303E−02 | 6.0630E−02 | −3.2090E−02 | −3.5328E−03 | 8.5576E−02 | −4.5540E−02 |
| 6th coefficient (B) | −4.3015E−03 | −1.5293E−03 | −7.2037E−04 | −2.5418E−02 | −3.5870E−02 | 9.2851E−03 | −2.9406E−04 | −1.3592E−02 |
| 8th coefficient (C) | 7.8711E−04 | 3.0046E−04 | −1.2348E−02 | −3.3858E−03 | 6.0541E−03 | 6.9686E−04 | −7.6228E−03 | −3.5966E−04 |
| 10th coefficient (D) | 9.0872E−04 | 2.4907E−03 | −2.9653E−03 | −3.1728E−03 | −4.8146E−04 | 1.6279E−03 | 3.6170E−03 | 1.1274E−03 |
| 12th coefficient (E) | 2.7060E−04 | −1.3609E−03 | −1.2395E−03 | −1.2961E−03 | −3.0527E−04 | −1.6158E−03 | −1.9868E−03 | −6.5713E−04 |
| 14th coefficient (F) | −1.6101E−04 | 7.7032E−05 | 2.2622E−03 | 7.5232E−04 | −3.4079E−04 | 3.6401E−04 | 7.5158E−04 | 4.9250E−04 |
| 16th coefficient (G) | 3.6202E−05 | −1.1494E−04 | −1.1053E−03 | −7.4405E−04 | −3.3925E−04 | −3.5926E−04 | −6.1246E−06 | −1.2547E−04 |
| 18th coefficient (H) | −9.5933E−05 | 3.6635E−03 | −3.5056E−04 | 1.4813E−05 | 8.6991E−05 | −3.3143E−05 | 1.2072E−04 | 5.8446E−05 |
| 20th coefficient (J) | 9.2916E−05 | 1.7162E−04 | −2.5220E−04 | 2.1577E−04 | −2.3720E−05 | −1.4897E−05 | −2.4151E−04 | −9.5799E−06 |
| 22th coefficient (L) | 2.2920E−05 | −1.3572E−04 | −1.6459E−04 | 2.4259E−04 | −4.1582E−05 | 2.5921E−04 | 1.1997E−04 | 1.5816E−04 |
| 24th coefficient (M) | −1.6925E−05 | 7.1310E−05 | 4.9830E−04 | 3.6633E−04 | −2.7683E−05 | 8.9609E−05 | 1.0967E−04 | 1.8199E−04 |
| 26th coefficient (N) | 7.8424E−06 | −1.1560E−05 | 2.2021E−04 | 2.6218E−04 | 2.0651E−05 | 2.7728E−06 | 8.0758E−05 | 4.1094E−05 |
| 28th coefficient (O) | 6.6080E−06 | −4.2435E−05 | −2.5902E−05 | 1.1215E−04 | 6.0020E−05 | −1.7559E−05 | −3.0988E−05 | 3.9686E−05 |
| 30th coefficient (P) | 2.0759E−06 | −2.7337E−05 | −5.7509E−05 | 2.8444E−05 | 1.7987E−05 | 3.3693E−05 | 1.9044E−05 | −1.8674E−05 |

| Surface # | 10 | 11 | 13 | 14 | 15 | 16 | 17 | 18 |
|---|---|---|---|---|---|---|---|---|
| Y radius | 8.5910E+00 | −8.7133E+02 | −8.8556E+00 | −6.7992E+00 | −7.0180E+00 | −5.5394E+00 | −5.1148E+00 | −3.2961E+01 |
| conic constant (K) | −2.5758E+00 | 0.0000E+00 | 0.0000E+00 | 0.0000E+00 | 4.0549E−01 | −8.4855E−01 | −1.1676E+00 | 2.2145E+01 |
| 4th coefficient (A) | −3.3234E−02 | 9.7245E−03 | −1.3747E−01 | −2.0445E−01 | 9.9311E−01 | 1.1241E+00 | 9.1200E−02 | −1.3824E+00 |
| 6th coefficient (B) | −8.8893E−03 | −9.6623E−03 | 3.5457E−02 | −3.8563E−02 | 1.0346E−01 | 2.3703E−01 | 2.9549E−01 | 3.3183E−01 |
| 8th coefficient (C) | 1.6090E−04 | −4.9970E−05 | 6.2772E−03 | 3.2288E−02 | 4.1558E−02 | −1.8823E−02 | −8.7642E−02 | −5.4543E−02 |
| 10th coefficient (D) | 6.8420E−04 | −5.7246E−04 | −2.4849E−02 | −2.2965E−02 | −4.5357E−02 | −5.6793E−03 | −8.1301E−03 | −1.7577E−02 |
| 12th coefficient (E) | −2.9047E−04 | −8.4709E−04 | 1.3772E−02 | 2.2288E−03 | −5.2644E−03 | −1.5667E−02 | −1.3309E−02 | −2.8266E−03 |
| 14th coefficient (F) | 1.3610E−04 | −5.3811E−04 | 2.2172E−04 | 6.7766E−03 | −3.1454E−03 | −1.5034E−02 | 5.5308E−03 | 8.1611E−03 |
| 16th coefficient (G) | −1.0211E−04 | −2.3080E−04 | −3.2710E−03 | −2.2444E−03 | −2.7470E−04 | 3.1744E−03 | −1.2344E−03 | 3.8040E−03 |
| 18th coefficient (H) | −2.1594E−05 | 1.0132E−05 | 2.1479E−03 | −1.9195E−03 | −2.3489E−03 | 3.8129E−04 | 1.8205E−03 | 7.8773E−03 |
| 20th coefficient (J) | 2.3019E−05 | 1.2844E−04 | −4.2663E−04 | 3.2451E−03 | −2.6134E−04 | 3.0200E−04 | 3.5726E−03 | −2.0705E−02 |
| 22th coefficient (L) | −7.7298E−06 | 2.1453E−04 | −1.4362E−03 | 1.8117E−03 | −1.0240E−03 | −4.9898E−05 | −4.2971E−03 | 1.2152E−02 |
| 24th coefficient (M) | 3.9581E−05 | 2.2348E−04 | 1.3815E−03 | −5.5030E−04 | 5.6845E−04 | 8.3761E−04 | 8.9271E−04 | 3.4068E−03 |
| 26th coefficient (N) | −1.7326E−05 | 1.2700E−04 | −3.9962E−04 | −1.4303E−04 | 6.0701E−04 | 1.1281E−03 | 1.0305E−03 | −7.8898E−04 |
| 28th coefficient (O) | −9.5784E−06 | 2.1845E−05 | −2.2754E−03 | 3.5973E−04 | −6.4516E−04 | 1.6045E−04 | −1.4096E−03 | −4.3031E−03 |
| 30th coefficient (P) | 4.8867E−06 | −1.6882E−05 | −1.0947E−03 | 1.6207E−04 | −4.2842E−04 | −1.8022E−04 | −7.8410E−04 | −8.4827E−03 |

Hereinafter, an optical system 700 will be described according to a seventh example embodiment with reference to FIGS. 7A to 7C.

Figure 7A:
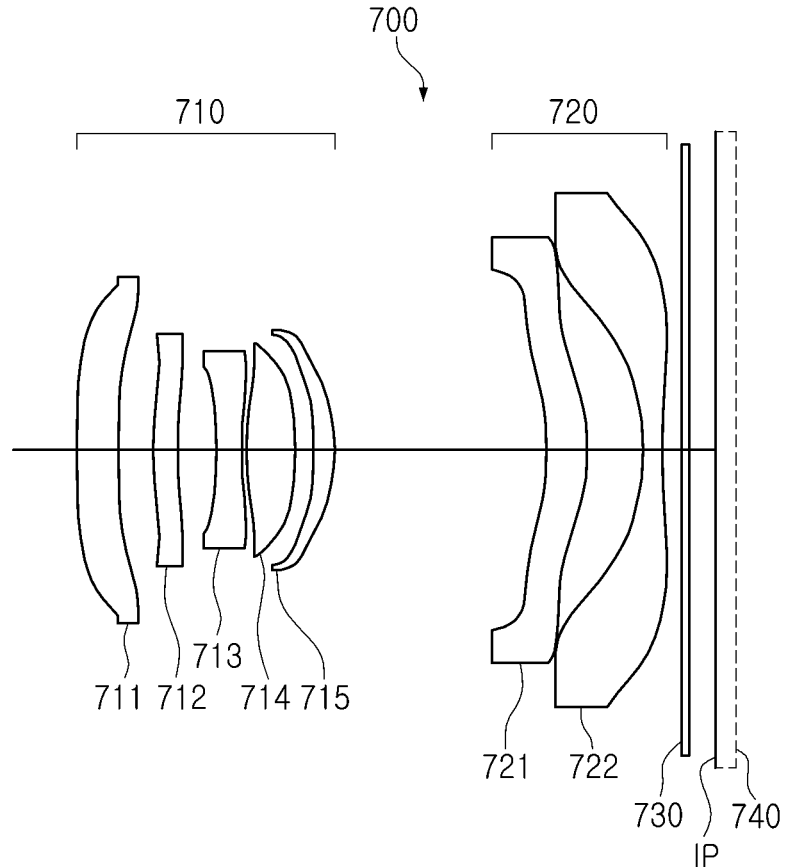
FIG. 7A is a cross-sectional diagram illustrating an optical system in a first position according to a seventh example embodiment of the present disclosure.
Figure 7B:
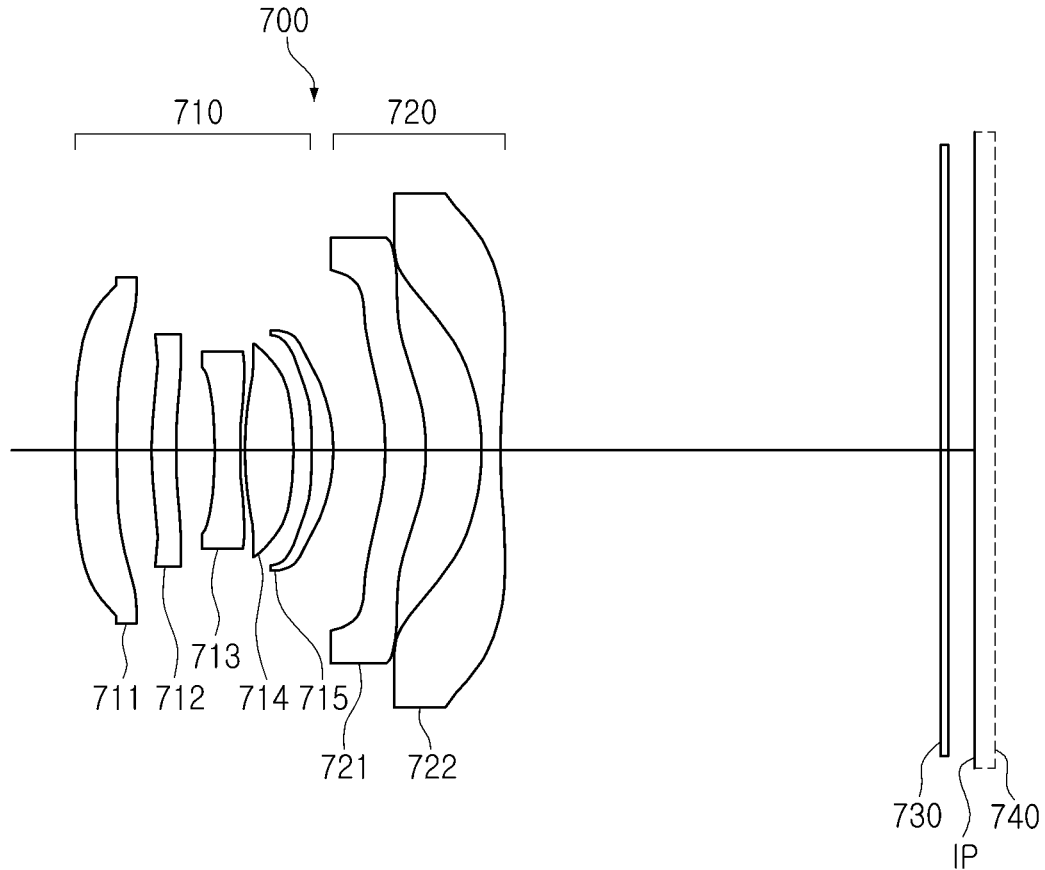
FIG. 7B is a cross-sectional diagram illustrating an optical system in a second position according to a seventh example embodiment of the present disclosure.
Figure 7C:
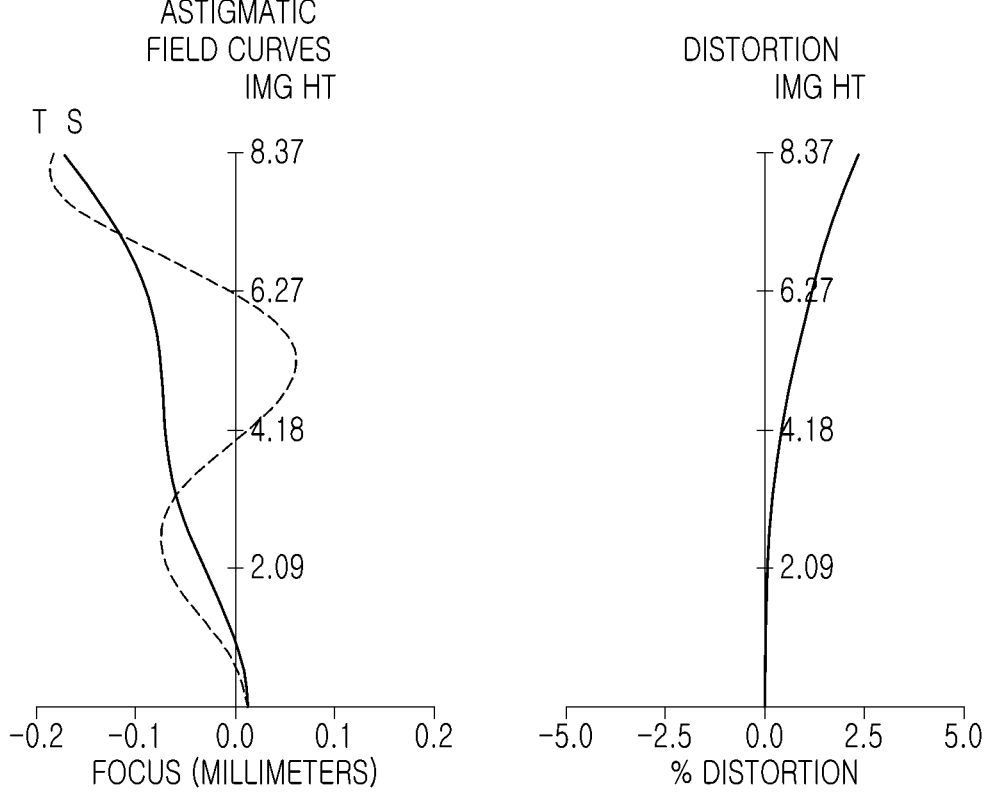
FIG. 7C depicts graphs illustrating aberration properties of an optical system according to a seventh example embodiment of the present disclosure.

FIG. 7A is a cross-sectional diagram illustrating an optical system 700 in a first position according to a seventh example embodiment. FIG. 7B is a cross-sectional diagram illustrating an optical system 700 in a second position according to a seventh example embodiment. FIG. 7C depicts graphs illustrating aberration properties of an optical system 700 according to a seventh example embodiment.

The optical system 700 may include two lens groups, and an image sensor 740. The first lens group 710 may include first to fifth lenses 711, 712, 713, 714, and 715, and the second lens group 720 may include a sixth lens 721 and a seventh lens 722.

As the first lens group 710 and the second lens group 720 move in the optical axis direction with respect to the image sensor 740, the magnification of the optical system 700 may change. The magnification in the first position may be approximately twice the magnification in the second position.

The focal length may be 10.4 mm in the first position, and may be 20.2 mm in the second position. The F-number may be 2.3 in the first position and may be 4.6 in the second position. A half the length of the diagonal of the imaging plane IP of the image sensor 740 may be 8.166 mm.

The first lens group 710 may have positive refractive power, and the second lens group 720 may have negative refractive power. The focal length of the first lens group 710 may be 8.97 mm, and the focal length of the second lens group 720 may be −10.00 mm.

The optical system 700 may include an aperture stop disposed between the fifth lens 715 and the sixth lens 721.

The optical system 700 may include an IR filter 730 disposed between the seventh lens 722 and the image sensor 740. The optical system 700 may include seven lenses having refractive power. Two lenses adjacent to each other among the lenses of the optical system 700 may be spaced apart from each other in the optical axis direction.

The first lens 711 may have negative refractive power. The object-side surface of the first lens 711 may be convex in the paraxial region. The image-side surface of the first lens 711 may be concave in the paraxial region. The object-side surface of the first lens 711 may be aspherical. The image-side surface of the first lens 711 may be aspherical.

The second lens 712 may have positive refractive power. The object-side surface of the second lens 712 may be convex in the paraxial region. The image-side surface of the second lens 712 may be concave in the paraxial region. The object-side surface of the second lens 712 may be aspherical. The image-side surface of the second lens 712 may be aspherical.

The third lens 713 may have negative refractive power. The object-side surface of the third lens 713 may be concave in the paraxial region. The image-side surface of the third lens 713 may be concave in the paraxial region. The object-side surface of the third lens 713 may be aspherical. The image-side surface of the third lens 713 may be aspherical.

The fourth lens 714 may have positive refractive power. The object-side surface of the fourth lens 714 may be convex in the paraxial region. The image-side surface of the fourth lens 714 may be convex in the paraxial region. The object-side surface of the fourth lens 714 may be aspherical. The image-side surface of the fourth lens 714 may be aspherical.

The fifth lens 715 may have positive refractive power. The object-side surface of the fifth lens 715 may be concave in the paraxial region. The image-side surface of the fifth lens 715 may be convex in the paraxial region. The object-side surface of the fifth lens 715 may be aspherical. The image-side surface of the fifth lens 715 may be aspherical.

The sixth lens 721 may have positive refractive power. The object-side surface of the sixth lens 721 may be concave in the paraxial region. The image-side surface of the sixth lens 721 may be convex in the paraxial region. The object-side surface of the sixth lens 721 may be aspherical. The image-side surface of the sixth lens 721 may be aspherical.

The seventh lens 722 may have negative refractive power. The object-side surface of the seventh lens 722 may be concave in the paraxial region. The image-side surface of the seventh lens 722 may be concave in the paraxial region. The object-side surface of the seventh lens 722 may be aspherical. The image-side surface of the seventh lens 722 may be aspherical.

The image-side surface of the first lens 711 may include an inflection point.

The object-side surface of the second lens 712 may include an inflection point. The object-side surface of the second lens 712 may be convex in the paraxial region and may be concave in the external region of the paraxial region.

The image-side surface of the third lens 713 may include an inflection point. The image-side surface of the third lens 713 may be concave in the paraxial region and may be convex in the external region of the paraxial region.

The object-side surface of the sixth lens 721 may include an inflection point. The image-side surface of the sixth lens 721 may include an inflection point.

The object-side surface of the seventh lens 722 may include an inflection point. The image-side surface of the seventh lens 722 may include an inflection point. The image-side surface of the seventh lens 722 may be concave in the paraxial region and may be convex in the external region of the paraxial region.

In the seventh example embodiment, G1_OAL may be 6.738, $|1x\_f/f3|$ may be 1.132, $|2x\_f/f3|$ may be 2.196, 1xL/2xL may be 0.713, 1xB/2xB may be 0.115, and |G1F/G2F| may be 0.897.

Table 13 lists optical and physical parameters of the optical system 700 in the seventh example embodiment. Table 14 lists aspherical data of the optical system 700 in the seventh example embodiment.

TABLE 13

| optical element | Surface # | Radius | Thickness (Position 1) | Thickness (Position 2) | Index | Abbe # |
|---|---|---|---|---|---|---|
| | Object | Infinity | Infinity | Infinity | | |
| | 1 | Infinity | 0.000 | 0.000 | | |
| 1st lens | 2 | 95.069 | 1.079 | 1.079 | 1.535 | 56.1 |
| | 3 | 44.709 | 0.908 | 0.908 | | |
| 2nd lens | 4 | 10.490 | 0.650 | 0.650 | 1.680 | 18.4 |
| | 5 | 14.768 | 1.000 | 1.000 | | |
| 3rd lens | 6 | −14.225 | 0.671 | 0.671 | 1.637 | 23.4 |
| | 7 | 10.850 | 0.118 | 0.118 | | |
| 4th lens | 8 | 7.315 | 1.273 | 1.273 | 1.535 | 56.1 |
| | 9 | −9.927 | 0.481 | 0.481 | | |
| 5th lens | 10 | −9.494 | 0.558 | 0.558 | 1.535 | 56.1 |
| | 11 | −4.174 | 0.800 | 0.800 | | |
| aperture stop | 12 | Infinity | 4.743 | 0.558 | | |
| 6th lens | 13 | −6.165 | 1.057 | 1.057 | 1.760 | 27.0 |
| | 14 | −4.829 | 1.447 | 1.447 | | |
| 7th lens | 15 | −6.920 | 0.500 | 0.500 | 1.637 | 23.4 |
| | 16 | 13.461 | 0.500 | 11.391 | | |
| filter | 17 | Infinity | 0.210 | 0.210 | 1.518 | 64.2 |
| | 18 | Infinity | 0.712 | 0.712 | | |
| imaging plane | Image | Infinity | −0.012 | −0.012 | | |

TABLE 14

| Surface # | 2 | 3 | 4 | 5 | 6 | 7 | 8 |
|---|---|---|---|---|---|---|---|
| Y radius | 9.5069E+01 | 4.4709E+01 | 1.0490E+01 | 1.4768E+01 | −1.4225E+01 | 1.0850E+01 | 7.3150E+00 |
| conic constant (K) | 9.9000E+01 | 9.8404E+01 | −4.3730E+01 | −3.2686E+01 | 3.5049E+01 | −8.9463E+01 | −1.1014E+01 |
| 4th coefficient (A) | 8.0332E−01 | 3.3606E−01 | −1.8993E−02 | −9.9161E−03 | −3.5126E−02 | −2.2478E−02 | −5.4681E−02 |
| 6th coefficient (B) | 4.3805E−02 | −6.7681E−02 | −2.8202E−02 | −5.9002E−03 | −5.1307E−04 | −3.6775E−03 | −1.0240E−03 |
| 8th coefficient (C) | 5.2151E−03 | −7.8612E−03 | 1.0955E−03 | −3.3431E−04 | −5.4440E−04 | −5.2316E−05 | −8.7277E−04 |
| 10th coefficient (D) | −8.6819E−04 | 1.4104E−03 | 7.2242E−04 | 1.9765E−04 | 1.1087E−04 | −7.1153E−05 | 2.1666E−05 |
| 12th coefficient (E) | −2.1753E−03 | 7.2829E−03 | 1.1081E−04 | 2.3107E−05 | −1.4233E−05 | 4.4869E−05 | 2.7837E−05 |
| 14th coefficient (F) | −4.906IE−04 | 4.0814E−04 | −3.9319E−05 | −3.8904E−06 | 9.4622E−06 | −1.1207E−05 | −8.0924E−06 |
| 16th coefficient (G) | −2.4421E−04 | −2.2666E−05 | 6.1116E−06 | −2.4224E−06 | −2.9097E−06 | 2.4394E−06 | 4.7237E−06 |
| 18th coefficient (H) | −9.4343E−05 | −1.0253E−04 | −1.8252E−06 | 9.3625E−07 | 6.8498E−08 | −5.2183E−07 | −1.1079E−06 |
| 20th coefficient (J) | 3.9891E−05 | 2.2737E−05 | 1.8715E−07 | −9.1957E−08 | 9.907IE−08 | 4.6964E−08 | 6.6615E−08 |

| Surface # | 9 | 10 | 11 | 13 | 14 | 15 | 16 |
|---|---|---|---|---|---|---|---|
| Y radius | −9.9275E+00 | −9.4935E+00 | −4.1741E+00 | −6.1652E+00 | −4.8293E+00 | −6.9199E+00 | 1.3461E+01 |
| conic constant (K) | 1.0244E+01 | 6.2199E+00 | −1.8878E+00 | 3.8936E−01 | −1.5938E+00 | 2.9115E−01 | −4.5636E+00 |
| 4th coefficient (A) | −1.5368E−01 | −1.2637E−01 | −1.9996E−02 | 1.5989E+00 | 1.7526E+00 | −1.3132E−01 | −2.9760E+00 |
| 6th coefficient (B) | −1.1054E−02 | 5.0470E−04 | 1.2246E−02 | −1.7064E−01 | −1.7681E−01 | 4.236IE−01 | 2.2264E−01 |

TABLE 14-continued

| | | | | | | | |
|---|---|---|---|---|---|---|---|
| 8th coefficient (C) | 2.6698E−03 | 1.4803E−02 | 7.2330E−03 | −8.5672E−02 | −5.8037E−02 | 8.0369E−02 | −5.2663E−02 |
| 10th coefficient (D) | −4.8137E−05 | −3.3508E−04 | −3.7263E−03 | −1.9243E−02 | 7.2627E−03 | −4.2234E−02 | 5.1517E−02 |
| 12th coefficient (E) | −5.5320E−05 | −1.4818E−03 | −2.6036E−03 | −2.9827E−04 | 2.4172E−02 | 8.4567E−03 | −8.6508E−03 |
| 14th coefficient (F) | 9.1808E−06 | −1.0599E−04 | 1.1017E−04 | −3.9872E−03 | −6.1663E−03 | −5.9648E−03 | −6.1306E−03 |
| 16th coefficient (G) | −6.3876E−06 | 9.1408E−05 | 2.1466E−04 | −3.1401E−03 | −3.8977E−03 | 1.5894E−03 | 4.0698E−03 |
| 18th coefficient (H) | 3.4472E−06 | 3.0656E−05 | −1.6670E−05 | −1.0592E−03 | 1.6659E−03 | −8.2069E−04 | −7.4376E−04 |
| 20th coefficient (J) | −4.9792E−07 | −1.6995E−05 | −4.2731E−05 | −1.1095E−03 | −2.7346E−04 | 2.3542E−04 | 5.3248E−03 |

According to the aforementioned example embodiments, an optical system providing various magnifications and high resolution using a single camera may be provided.

While specific example embodiments have been illustrated and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical system, comprising:
a first lens group including a plurality of lenses; and
a second lens group including a plurality of lenses,
wherein the first lens group and the second lens group are disposed in order from an object side,
wherein among the lenses included in the second lens group, a lens disposed adjacent to a lens disposed farthest from the object side has an inflection point,
wherein each of the first lens group and the second lens group is configured to move in an optical axis direction to change a magnification between a wide-angle end and a telephoto end,
wherein G1F is a focal length of the first lens group, G2F is a focal length of the second lens group, and |G1F/G2F| has a value of between 0.5 and 1,
wherein the lenses of the first lens group are disposed with spaces therebetween along an optical axis,
wherein the lenses of the second lens group are disposed with spaces therebetween along the optical axis,
wherein the lens disposed adjacent to the lens disposed farthest from the object side has positive refractive power, and
wherein the lens disposed farthest from the object side has negative refractive power.

2. The optical system of claim 1, wherein the first lens group has positive refractive power, and the second lens group has negative refractive power.

3. The optical system of claim 1, wherein the entire number of lenses included in the first lens group and the second lens group is six, seven, or eight.

4. The optical system of claim 1, wherein the first lens group includes four or more lenses having refractive power, and the second lens group includes two or more lenses having refractive power.

5. The optical system of claim 1, wherein at least one of an object-side surface and an image-side surface of each of the lenses of the first lens group is aspherical, and at least one of an object-side surface and an image-side surface of each of the lenses of the second lens group is aspherical.

6. The optical system of claim 1, wherein G1_OAL is a distance between an object-side apex of a lens most adjacent to the object side among the lenses included in the first lens group and an image-side apex of a lens most adjacent to the image side among the lenses included in the first lens group, and G1_OAL is less than 10 mm.

7. The optical system of claim 1, wherein 1xL is a distance from an object-side surface of a lens most adjacent to the object side among the lenses of the first lens group at the wide-angle end to an imaging plane, 2xL is a distance from the object-side surface of the lens most adjacent to the object side at the telephoto end to the imaging plane, and 1xL/2xL is greater than 0.7.

8. The optical system of claim 1, wherein 1xB is a distance from an apex of an image-side surface of a lens most adjacent to the image side among the lenses of the second lens group at the wide-angle end to the imaging plane, 2xB is a distance from the apex of the image-side surface of the lens most adjacent to the image side at the telephoto end to the imaging plane, and 1xB/2xB is greater than 0.1.

9. The optical system of claim 1, wherein at least one of the object-side surface and the image-side surface of at least one of the lenses of the first lens group includes at least one inflection point, and at least one of the object-side surface and the image-side surface of at least one of the lenses of the second lens group includes at least one inflection point.

10. The optical system of claim 1, wherein the first lens group includes a first lens having positive refractive power, a second lens having refractive power, a third lens having refractive power, a fourth lens having refractive power, and a fifth lens having refractive power, disposed in order from the object side to the image side.

11. The optical system of claim 1, wherein the second lens group includes a sixth lens having refractive power and a seventh lens having positive refractive power, disposed in order from the object side to the image side.

12. The optical system of claim 1, further comprising:
an aperture stop disposed between the first lens group and the second lens group.

13. An optical system, comprising:
a first lens group including at least one lens; and
a second lens group including at least one lens,
wherein the first lens group and the second lens group are disposed in order from an object side,
wherein each of the first lens group and the second lens group is configured to move in an optical axis direction to change a magnification between a wide-angle end and a telephoto end,
wherein G1F is a focal length of the first lens group, G2F is a focal length of the second lens group, and |G1F/G2F| has a value of between 0.5 and 1, wherein the first lens group includes a first lens, a second lens, and a third lens disposed in order from the object side to the image side, and wherein 1x_f is a focal length of the optical system at the wide-angle end, f3 is a focal length of the third lens, and |1x_f/f3| has a value of between 1 and 2.

14. An optical system, comprising:

a first lens group including at least one lens; and a second lens group including at least one lens, wherein the first lens group and the second lens group are disposed in order from an object side, wherein each of the first lens group and the second lens group is configured to move in an optical axis direction to change a magnification between a wide-angle end and a telephoto end, wherein G1F is a focal length of the first lens group, G2F is a focal length of the second lens group, and |G1F/G2F| has a value of between 0.5 and 1, wherein the first lens group includes a first lens, a second lens, and a third lens disposed in order from the object side to the image side, and wherein 2x_f is a focal length of the optical system at the telephoto end, f3 is a focal length of the third lens, and |2x_f/f3| has a value of between 2 and 3.8.

* * * * *